(12) United States Patent
Liu et al.

(10) Patent No.: US 9,906,600 B2
(45) Date of Patent: Feb. 27, 2018

(54) METHOD AND APPARATUS FOR INITIATING A HIGH-POWER CONNECTION VIA A LOW-POWER INTERFACE

(71) Applicant: Apple Inc., Cupertino, CA (US)

(72) Inventors: Yong Liu, Cupertino, CA (US); Christiaan A. Hartman, Cupertino, CA (US); Daniel R. Borges, Cupertino, CA (US); Sriram Hariharan, Cupertino, CA (US); Chiu Ngok E. Wong, Cupertino, CA (US); Su Khiong Yong, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 195 days.

(21) Appl. No.: 14/726,077

(22) Filed: May 29, 2015

(65) Prior Publication Data

US 2015/0350334 A1    Dec. 3, 2015

Related U.S. Application Data

(60) Provisional application No. 62/005,939, filed on May 30, 2014.

(51) Int. Cl.
*G06F 15/16* (2006.01)
*H04L 29/08* (2006.01)
(Continued)

(52) U.S. Cl.
CPC ............ *H04L 67/141* (2013.01); *H04L 67/16* (2013.01); *H04W 4/008* (2013.01); *H04W 48/16* (2013.01); *Y02B 60/50* (2013.01)

(58) Field of Classification Search
USPC .................. 709/227, 220, 223, 217, 222
See application file for complete search history.

(56) References Cited

U.S. PATENT DOCUMENTS

2008/0168160 A1* 7/2008 Tan ................. H04W 52/34
709/223
2009/0221283 A1* 9/2009 Soliman ........... H04W 48/14
455/426.1
(Continued)

FOREIGN PATENT DOCUMENTS

WO    WO 2013/192465 A1    12/2013

OTHER PUBLICATIONS

European Search Report directed to App. No. 15168743.1 dated Aug. 25, 2015; 7 pages.
(Continued)

*Primary Examiner* — Lan-Dai T Truong
(74) *Attorney, Agent, or Firm* — Sterne, Kessler, Goldstein & Fox P.L.L.C.

(57) ABSTRACT

An apparatus and methods are provided for initiating a network connection between a first device and a second device. While one or more high-power network interfaces of the first device are in a dormant state, the first device communicates with a second device via the first device's low-power network interface. The first device can determine, based on the communication, whether to establish a network connection with the second device via a high-power network interface of the first device. Next, if the first device is to establish the network connection with the second device via the high-power network interface, the device can wake the first high-power network interface and connect to the second device via the first high-power network interface.

23 Claims, 21 Drawing Sheets

(51) Int. Cl.
*H04W 4/00* (2018.01)
*H04W 48/16* (2009.01)

(56) References Cited

U.S. PATENT DOCUMENTS

| | | |
|---|---|---|
| 2013/0109323 A1 | 5/2013 | Ruutu et al. |
| 2013/0178163 A1 | 7/2013 | Wang |
| 2013/0244686 A1* | 9/2013 | Saha .................... G06F 1/3206 |
| | | 455/456.1 |
| 2014/0086164 A1 | 3/2014 | Kim et al. |

OTHER PUBLICATIONS

Joh, H., et al., "A hybrid Wi-Fi P2P with bluetooth low energy for optimizing smart device's communication property", Peer-to-Peer Networking and Applications, Apr. 25, 2014, vol. 8, No. 4; pp. 567-577.

Communication from the examining division directed to related European Patent Application No. 15168743.1, dated Feb. 6, 2017; 4 pages.

Townsend et al., "Getting Started with Bluetooth Low Energy," O'Reilly Media Inc., May 12, 2014; 180 pages.

\* cited by examiner

METHOD AND APPARATUS FOR INITIATING A HIGH-POWER CONNECTION VIA A LOW-POWER INTERFACE

RELATED APPLICATIONS

This application claims priority under 35 U.S.C. § 119 to U.S. Provisional Application No. 62/005,939, entitled "Method and Apparatus for Initiating a High-power Connection via a Low-power Interface", by the same inventors, filed on 30 May 2014, and the contents of which are incorporated herein by reference in its entirety.

BACKGROUND

Apparatus and methods are provided for conducting device and service discovery over a wireless network interface.

Mobile devices often possess Wi-Fi radio interfaces, which allow these devices to participate in infrastructure networks and communicate directly with other devices in a peer-to-peer (P2P) network. The ability to form network connections without a physical connection provides an advantage to mobile devices because such devices tend to move from one location to the next, forming temporary connections with other devices that are within range.

Mobile devices often depend on batteries for power. A device may conserve power by placing its Wi-Fi radio interface into a sleep state when not in use. However, while its Wi-Fi radio interface is asleep, the device may miss opportunities to discover and connect to other devices that come into range. Thus, what is needed is a method for conserving a mobile device's battery power while still allowing the device to discover and connect to other devices via a Wi-Fi connection.

SUMMARY

An apparatus and methods are provided for initiating a network connection between a first device and a second device. While one or more high-power network interfaces of the first device are in a dormant state, the first device communicates with a second device via the first device's low-power network interface. The first device can determine, based on the communication, whether to establish a network connection with the second device via a high-power network interface of the first device. Next, if the first device is to establish the network connection with the second device via the high-power network interface, the device can wake the first high-power network interface and connect to the second device via the first high-power network interface.

It should be noted that the process of communicating via low-power network interfaces may be handled by the low-power network interface's controller so participation from a host processor is not required. Thus, the process of communicating via low-power network interfaces may take place while the processors of both devices are in a suspended state. It should also be noted that the two devices may exchange connection parameters for establishing the connection over a high-power network interface while communicating over the low-power network interface, thereby facilitating and/or shortening future device/service discovery via the high-power network interface.

In some embodiments, when communicating with the second device via the low-power network interface, the first device can receive a service advertisement that is broadcasted by the second device. The service advertisement can disclose one or more services provided by a high-power network interface of the second device. If the first device is interested in a service disclosed in the service advertisement, the first device can send a request to the second device.

In some embodiments, a subsequent service advertisement can disclose one or more services provided by a second high-power network interface of the second device.

DETAILED DESCRIPTION

Figure 1A:
FIG. 1A illustrates an example communication environment.

The following description is provided in the context of a particular application and its requirements. Various modifications to the disclosed embodiments will be readily apparent to those skilled in the art, and the general principles defined herein may be applied to other embodiments and applications.

In some embodiments, an apparatus and methods are provided for conducting, via a low-power wireless technology, a mobile device's discovery of services that can use a high-power connection. In some embodiments, the device can possess a plurality of wireless network interfaces, which can include a Wi-Fi radio interface and a Bluetooth low Energy® (BTLE) radio interface. The device, which can be dependent on battery power, can manage its wireless network interfaces to reduce power usage. Networks formed using the Wi-Fi radio interface, which can include Neighbor Awareness Networking (NAN) networks and Wi-Fi Direct® (WFD) networks, are suitable for transferring large amounts of data between devices. In comparison to Wi-Fi, connections formed over the BTLE protocol can support a lower rate of data transfer but also uses less power. Some embodiments can leverage BTLE's smaller energy footprint and Wi-Fi's faster transfer rate by using BTLE interfaces to discover and initialize connections for Wi-Fi-based services.

Because a mobile device can frequently change locations, the mobile device oftentimes may not be in range of any other device. As a result, the device may suspend its Wi-Fi radio interface to conserve power. However, even when the interface is in a sleep state, the interface can continue to draw 150 µA. In comparison, a BTLE radio interface can draw only 2-4 µA while in a sleep state. To conserve power, some embodiments can have the mobile device switch off its Wi-Fi radio interface. To ensure that the device is still able to discover and connect to Wi-Fi services provided by other devices that come into range, these embodiments can utilize the device's BTLE radio interface to scan for the other devices.

Introduction

A P2P wireless communication environment can be characterized by any number of devices of the same type and/or different types—such as smartphones, tablets, personal digital assistants, wearable devices, laptop and desktop computers, and so on. Different devices can have different features, may execute different applications, may have different power levels (e.g., capacity and charge), different communication needs, different loads (e.g., on a processor, on an antenna), may be heard by other devices with varying signal strengths, etc. In addition, the communication environment may be fluid, with devices entering, moving through, and exiting the region encompassing the environment.

Embodiments disclosed herein enable devices in such an environment to discover each other and, in some cases, communicate with each other in a peer-to-peer fashion. These embodiments can: conserve power while ensuring that devices and services are discoverable; coexist with other communication technologies (e.g., Bluetooth®); support multi-band operation (e.g., 2.4 GHz and 5 GHz); avoid throughput and latency degradation encountered with network infrastructure (e.g., access points) while maintaining compatibility with infrastructure-based technologies; and/or be scalable to accommodate dense environments having many devices. These and other features and advantages are described below.

Communication Environment

FIGS. 1A-D provide communication environments 100-106, which include a number of computer systems based on a microprocessor and/or a digital signal processor. More specifically, communication environments 100-106 illustrate a communication environment at different stages of a process where peripheral device 110 communicates with central device 120 via BTLE to initialize a Wi-Fi connection. Once the Wi-Fi connection is formed, peripheral device 110 and central device 120 become members of a NAN network.

In some embodiments, peripheral device 110 and central device 120 can be wireless devices that include computational capability, such as PDAs, tablet computers, laptops, desktops, smartphones, and cell phones. Peripheral device 110 can also be an electronic peripheral such as a headset, a speaker, a GPS receiver, a mouse, a keyboard, a watch, an automotive component, a healthcare device, a security device, and/or a home automation device. In some embodiments, peripheral device 110 contains host processor 140 and central device 120 contains host processor 142.

It should be noted that device 110 can be referred to as a peripheral device. Peripheral devices are devices that can be paired to and/or associated with a central/master device, such as central device 120. Peripheral devices can broadcast advertisements to other devices in range, while central devices can search for peripheral devices by actively scanning for advertisement broadcasts. It should also be noted that, in some cases, peripheral device 110 and central device 120 can (1) both be central devices and (2) have the capability of pairing with each other.

Peripheral devices and central devices can include a low-power network interface such as a BTLE radio interface and a high-power network interface such as a Wi-Fi radio interface. Wi-Fi radio interfaces can implement virtual network interfaces such as a NAN interface and/or a WFD interface. As seen in FIGS. 1A-D, peripheral device 110 possesses BTLE interface 130 and a Wi-Fi radio interface that implements NAN interface 132 and WFD interface 134. Central device 120 possesses BTLE interface 136 and a Wi-Fi radio interface that implements NAN interface 138.

It should be noted that low-power network interfaces are not limited to BTLE interfaces and can represent other personal area network and low-power network technologies such as legacy Bluetooth, low power Long Term Evolution (LTE), Zigbee®, Z-Wave®, and NFC. High-power network interfaces are not limited to Wi-Fi radio interfaces and can represent other network technologies such as cellular network technologies, Ethernet and other wired networking technologies, Wireless Gigabit Alliance (WiGIG) technologies, and Worldwide Interoperability for Microwave Access (WiMAX). A high-power network interface can also represent relatively low-powered network technologies such as legacy Bluetooth and/or low power LTE. Virtual network interfaces implemented by a high-power network interface can include NAN interfaces, WFD interfaces, Independent Basic Service Set (IBSS) interfaces, and any virtual network interface/device/adapter or software-based networking technology that executes on top of a physical network interface.

It should also be noted that peripheral device 110 and central device 120 are physically close enough to each other to enable BTLE communications between the two devices.

In addition, different embodiments can feature operating environments and devices having configurations other than those depicted in FIGS. 1A-D.

Figure 2:
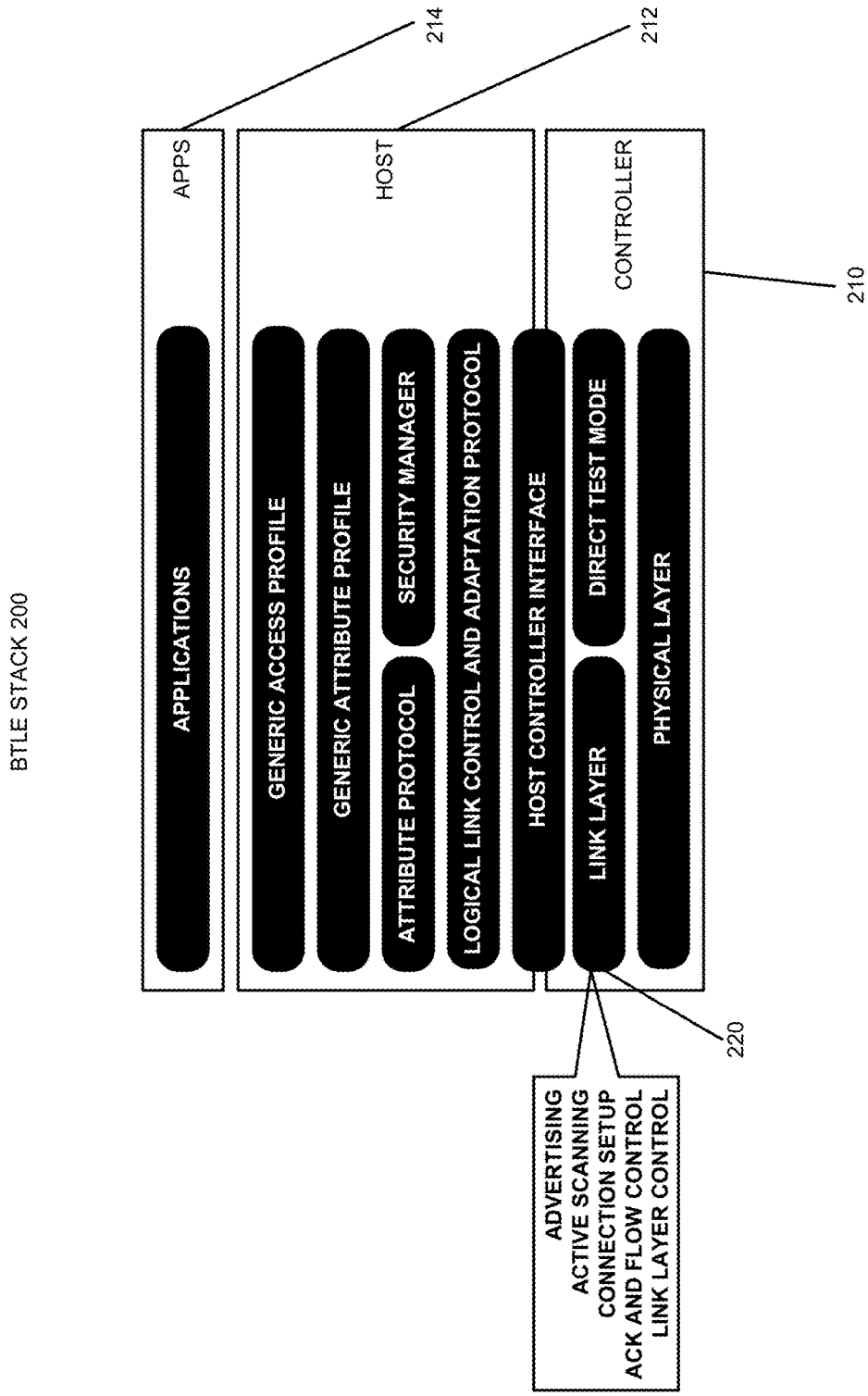
FIG. 2 illustrates an example Bluetooth low energy (BTLE) stack.

FIG. 2 illustrates an example BTLE stack 200. In some embodiments, BTLE stack 200 can be implemented within the software and/or firmware of a BTLE radio interface. BTLE stack 200 represents a hierarchical model of network and/or communications functions provided by the BTLE protocol. Each protocol layer can depend on services provided by protocol layers below it and can provide services for protocol layers above it. Protocol layers within BTLE stack 200 can be categorized in the following way: layers managed by the controller of a BTLE radio interface (referred to as controller layers 210), layers managed by the host device (referred to as host layers 212), and application layers (214). Link layer 220, which is a controller layer, can handle the broadcast of advertising frames, active scanning, connection setup, transmitting acknowledgment frames, flow control, and link layer control. The host layers can handle logical BTLE connections. The application layers can launch, control, and terminate end-user applications.

It should be noted that unlike other layers in BTLE stack 200, controller layers can operate on the controller of a BTLE radio interface and thus can operate without the assistance of the host device's processor. Once the host device's processor is suspended, the controller layers continue to function with reduced power consumption. For example, if central device 120 suspends processor 142 to save power, BTLE interface 136 cannot perform operations that involve layers other than controller layers without waking up processor 142. In some embodiments, central device 120 may need to rely on the protocol layers that reside within BTLE interface 136 to handle communications across BTLE.

The process of creating a BTLE connection between a peripheral device and a central device can begin in the controller layers. First, the peripheral device begins broadcasting advertising frames, also known as ADV_IND frames, to advertise services that it can provide over a BTLE connection. It should be noted that BTLE can operate with 40 2-MHz channels. Three of the 40 channels are reserved for device discovery. These channels, otherwise known as advertising channels, can include channels 37, 38, and 39. The other 37 channels can be used for data communication between BTLE devices that have already formed BTLE connections.

As the peripheral device broadcasts its advertising frames on BTLE advertising channels, the central device can receive one of the advertising frames and decide to connect to the peripheral device. The central device then transmits a connection request (CONNECT_REQ) frame across the same advertising channel on which it received the advertising frame. After establishing a BTLE connection at the link-layer level, the peripheral device and the central device can begin hopping among the BTLE data channels to avoid congesting BTLE advertising channels while exchanging data across the BTLE connection. Eventually, communications between the two devices enter the service discovery phase.

Initializing a High-Power Network Connection Via a Low-Power Interface

Figure 3:
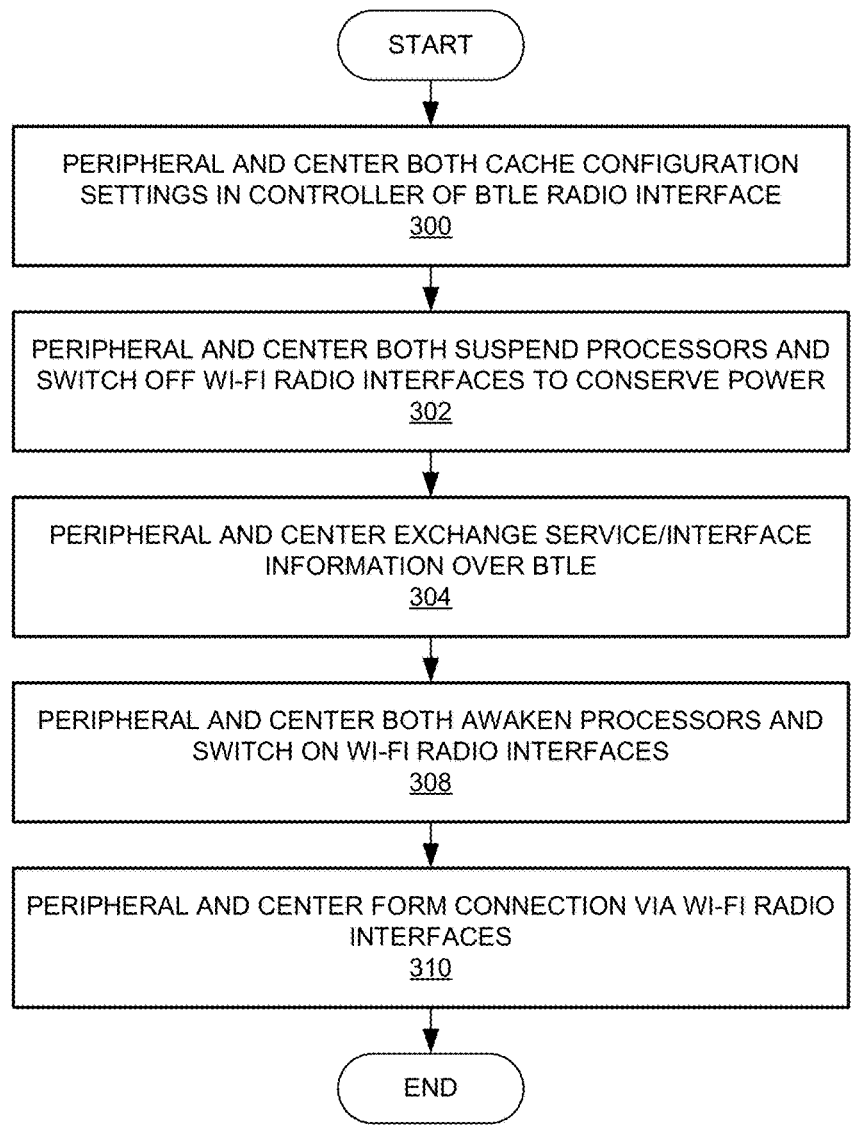
FIG. 3 presents a flowchart illustrating an example process of exchanging information over the BTLE protocol to initiate a Wi-Fi connection.
Figure 4:
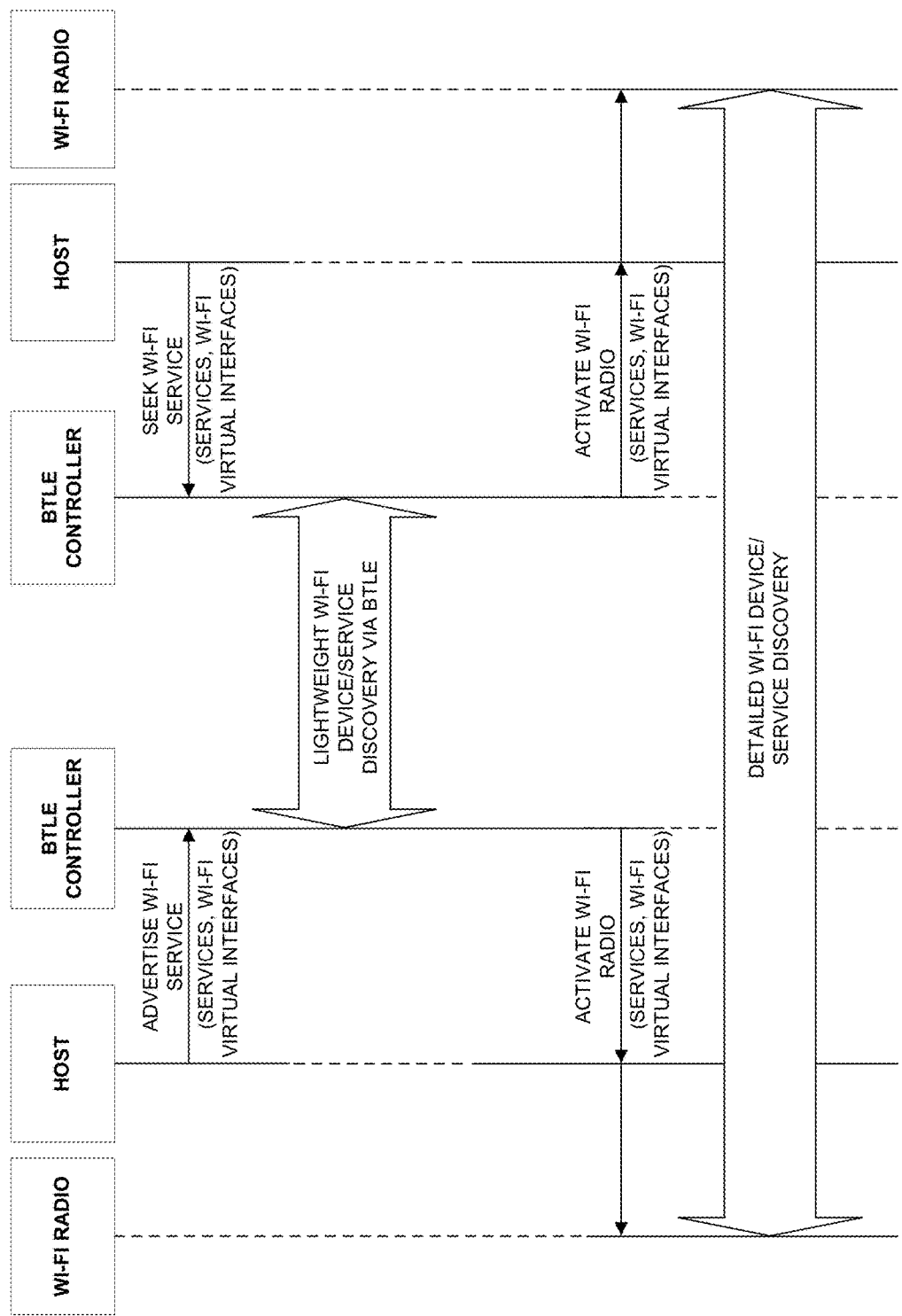
FIG. 4 presents an event diagram illustrating an example process of exchanging information over the BTLE protocol to initiate a Wi-Fi connection.

FIGS. 3 and 4, in conjunction with FIGS. 1A-D, provides an example of how a peripheral device and a central device communicate over the BTLE protocol to conserve power while initializing a Wi-Fi connection with each other. Using communication environment 100 of FIG. 1A as an example, peripheral device 110 and central device 120 are both initially unaware of the other's presence. All wireless interfaces of both devices are switched on and using power. Neither device has formed a Wi-Fi connection with the other device. Both devices conserve power by switching off their Wi-Fi radio interfaces. To do so, each device offloads service discovery to the controller of their BTLE radio interface by storing service and virtual network interface information within the controller, thereby enabling the controller layers to communicate such information to other devices (1) without the assistance of the device's host processor and (2) with reduced power consumption (operation 300). Information regarding a particular service (which a peripheral device might need to provide) or service request (which a central device might need to make) can include (1) a six-byte service ID/hash, (2) a full or partial service name, (3) detailed information about the service, and (4) an indication/identification of the virtual network interface(s) that provides or requests the service. Information regarding a particular virtual network interface can include (1) the interface's index, (2) the interface's type (such as NAN, WFD, or IBSS), (3) a full or partial MAC address of the virtual network interface, (4) a time duration lasting from the device's confirmation of Wi-Fi radio interface activation until the corresponding virtual network interface becomes available, (5) the virtual network interface's rendezvous channel, and (6) other interface-specific information such as the virtual network interface's state, transfer rate, or role.

Next, to conserve power, devices 110 and 120 can suspend their processors and transition their Wi-Fi radio interfaces into a dormant state (operation 302). The process of transitioning a Wi-Fi radio interface into a dormant state can include one or more of the following steps: turning/switching the interface off, placing the interface into a hibernation mode, placing the interface into a deep sleep mode, and placing the interface into any sort of state that could enable the host device to conserve power. Afterwards, both devices 110 and 120 can rely on BTLE interfaces 130 and 136 to discover devices and services. Devices 110 and 120 then begin exchanging service information and virtual network interface information over the BTLE protocol (operation 304). Peripheral device 110 begins periodically conducting advertising events to advertise its services and virtual network interfaces. In the meantime, central device 120 begins scanning BTLE advertising channels for advertising frames. Whenever central device 120 receives an advertising frame, it can check the frame to see whether peripheral device 110 (1) possesses a virtual network interface that central device 120 can utilize (which, in this case, is a NAN interface), and (2) whether that virtual network interface provides a service that central device 120 is interested in. In other words, central device 120 is searching for a peripheral device that offers a specific service/interface combination. It should also be noted that peripheral device 110 can offer a different set of services through each of its virtual network interfaces. In other words, each virtual network interface provides a "service set."

Figure 5A:
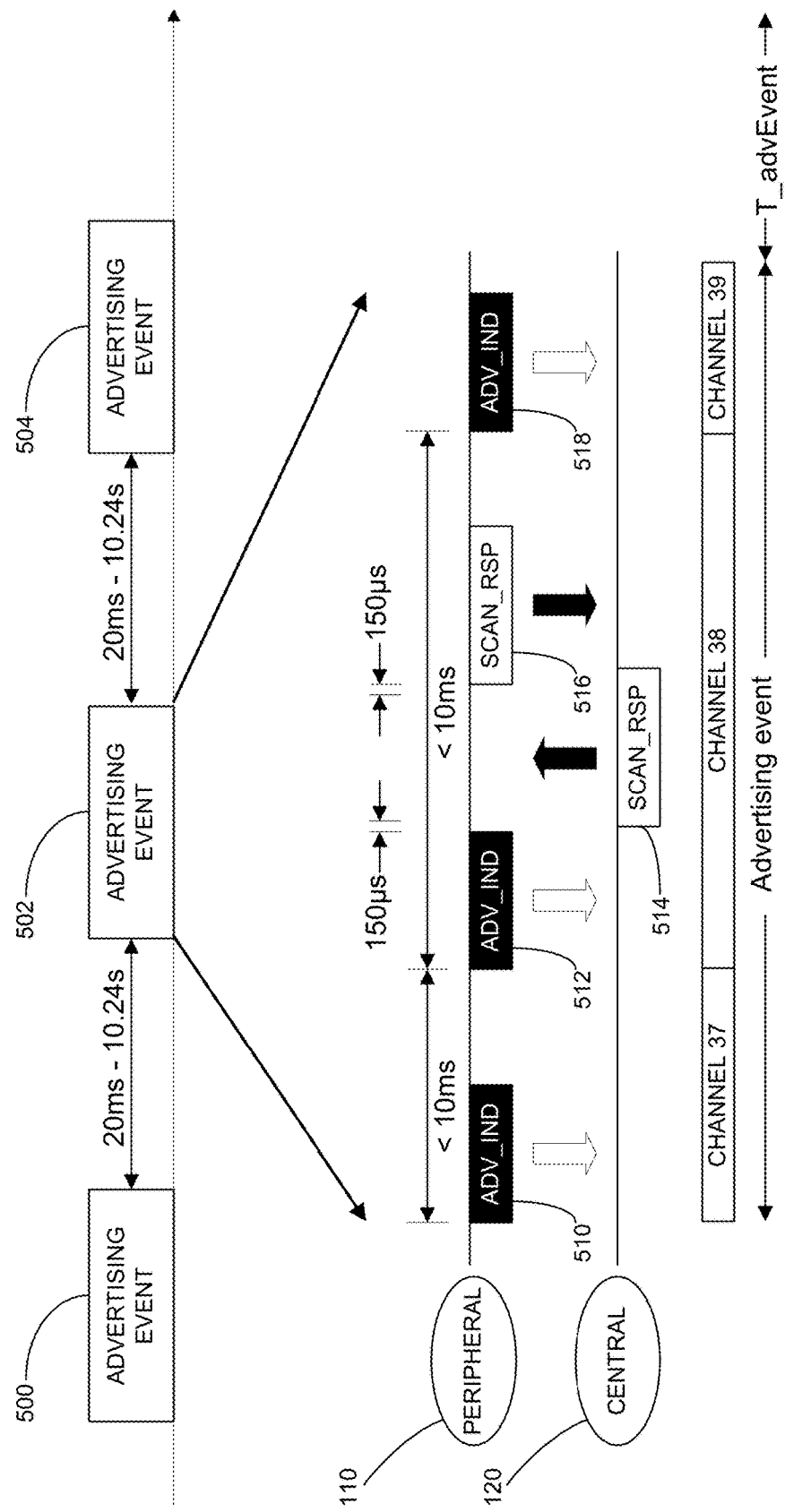
FIG. 5A illustrates an example sequence of advertising events.

FIG. 5A illustrates a series of consecutive advertising events 500, 502, and 504 conducted by peripheral device 110. During an advertising event, peripheral device 110 transmits a single advertising frame across each BTLE advertising channel. If central device 120 receives an advertising frame, central device 120 can respond by transmitting its own BTLE frames. For example, in response to an advertising frame received from peripheral device 110, central device 120 can transmit a scan request frame (SCAN_REQ frame) to peripheral device 110.

As shown in FIG. 5A, peripheral device 110 first conducts advertising event 500. In some embodiments, peripheral device 110 can switch BTLE interface 130 from a sleep state to an active state to broadcast, e.g., three consecutive advertising frames. If central device 120 is out of range or turned off, peripheral device 110 may not receive a response. Without the participation of central device 120, peripheral device 110 can simply broadcast an advertising frame once on channel 37, once on channel 38, and once on channel 39. The period during which a single advertising frame is broadcast is no more than, e.g., 10 ms. As a result, advertising event 500 can last no more than, e.g., 30 ms.

After advertising event 500, peripheral device 110 returns BTLE interface 130 to a deep-sleep state and waits between 20 ms and 10.24 s until the next scheduled advertising event. Once peripheral device 110 reaches advertising event 502, it reawakens BTLE interface 130, which is used to broadcast a second advertising frame. At this point, central device 120 may be in range. While scanning channel 38, if BTLE interface 136 detects an advertising frame that advertises a service/interface combination that central device 120 is interested in, it can respond with a scan request frame. BTLE interface 136 does not detect advertising frame 510 because it is sent on a different advertising channel (i.e., channel 37). However, BTLE interface 136 does pick up advertising frame 512, which is sent on channel 38. If central device 120 determines that advertising frame 512 advertises a service that central device 120 is interested in, BTLE interface 136 transmits scan request frame 514 to peripheral device 110. In response to receiving scan request frame 514, BTLE interface 130 transmits a scan response (SCAN_RSP) frame that can contain detailed information regarding the currently advertised service set or service/interface combination. Advertising frame 518, which is advertised on channel 39, goes undetected by central device 120. Additionally, between, e.g., 20 ms and 10.24 s after advertising event 502 finishes, peripheral device 110 can conduct advertising event 504.

Figure 5B:
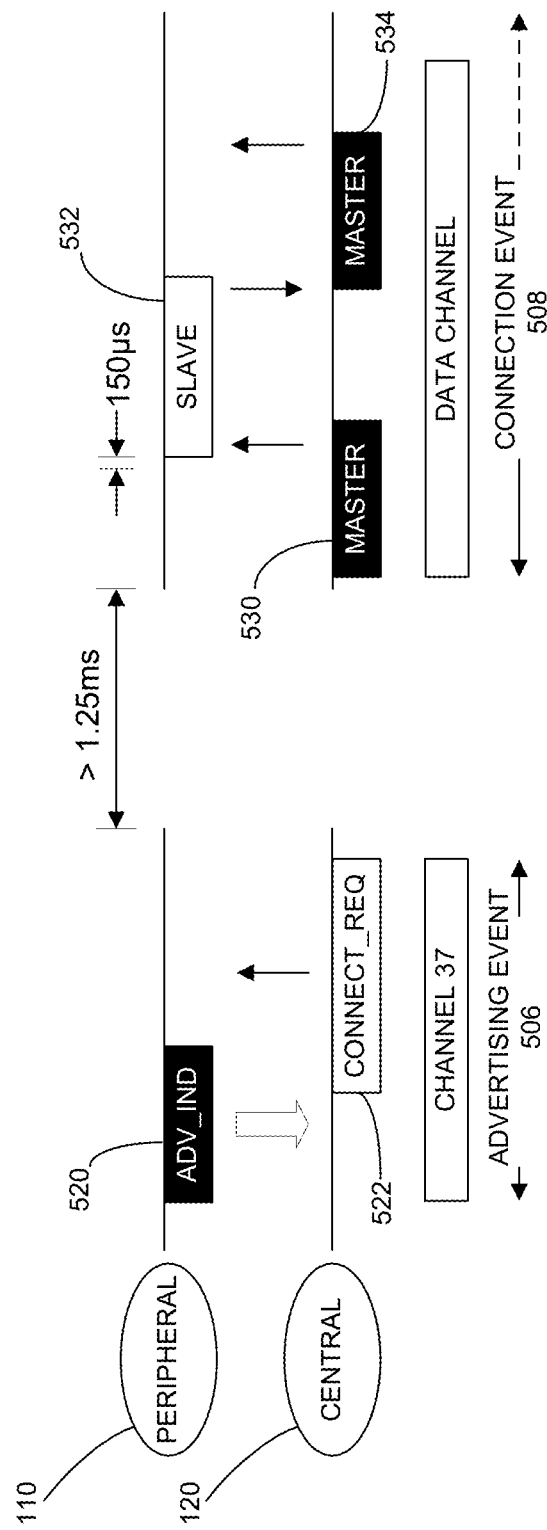
FIG. 5B illustrates an example advertising event and an example connection event.

In some embodiments, rather than respond to an advertising frame with a scan request, a central device can attempt to form a BTLE connection with the peripheral device by sending it a connection request frame. If the connection succeeds, a connection event is initiated between the central device and the peripheral device. FIG. 5B depicts an illustrative scenario in which central device 120 responds to advertising frame 520 with connect request frame 522 on channel 37, wherein frame 520 was sent by peripheral device 110 on channel 37. A period of 1.25 ms passes after the end of advertising event 506 before a connection is formed between the two devices. During connection event 508, central device 120, which can now be referred to as the master device, and peripheral device 110, which can now be referred to as the slave device, exchange data frames 530-534. It should be noted that during the connection event may be conducted using the controller, without waking up the host processor.

Figure 1B:
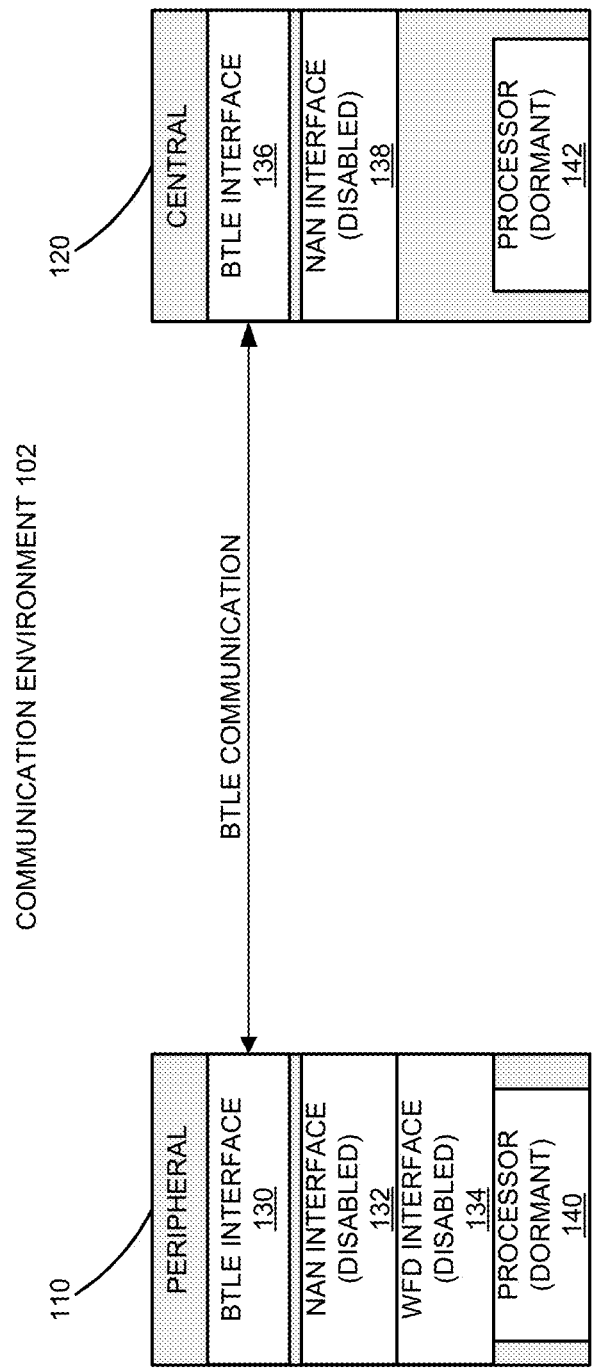
FIG. 1B illustrates an example communication environment.

As illustrated in FIG. 1B, devices 110 and 120 proceed to exchange data over the BTLE protocol. During the exchange over the BTLE protocol, central device 120 may want the following information from peripheral device 110: (1) whether peripheral device 110 provides a service/interface combination that central device 120 desires, and (2) information that allows central device 120 to quickly connect to peripheral device 110 via Wi-Fi or some other high-power network interface. Examples of the latter type of information include NAN interface 132's interface type, network address, and preferred rendezvous channel. Peripheral device 110 may want to know NAN interface 138's interface type, network address, and preferred rendezvous channel.

Figure 6:
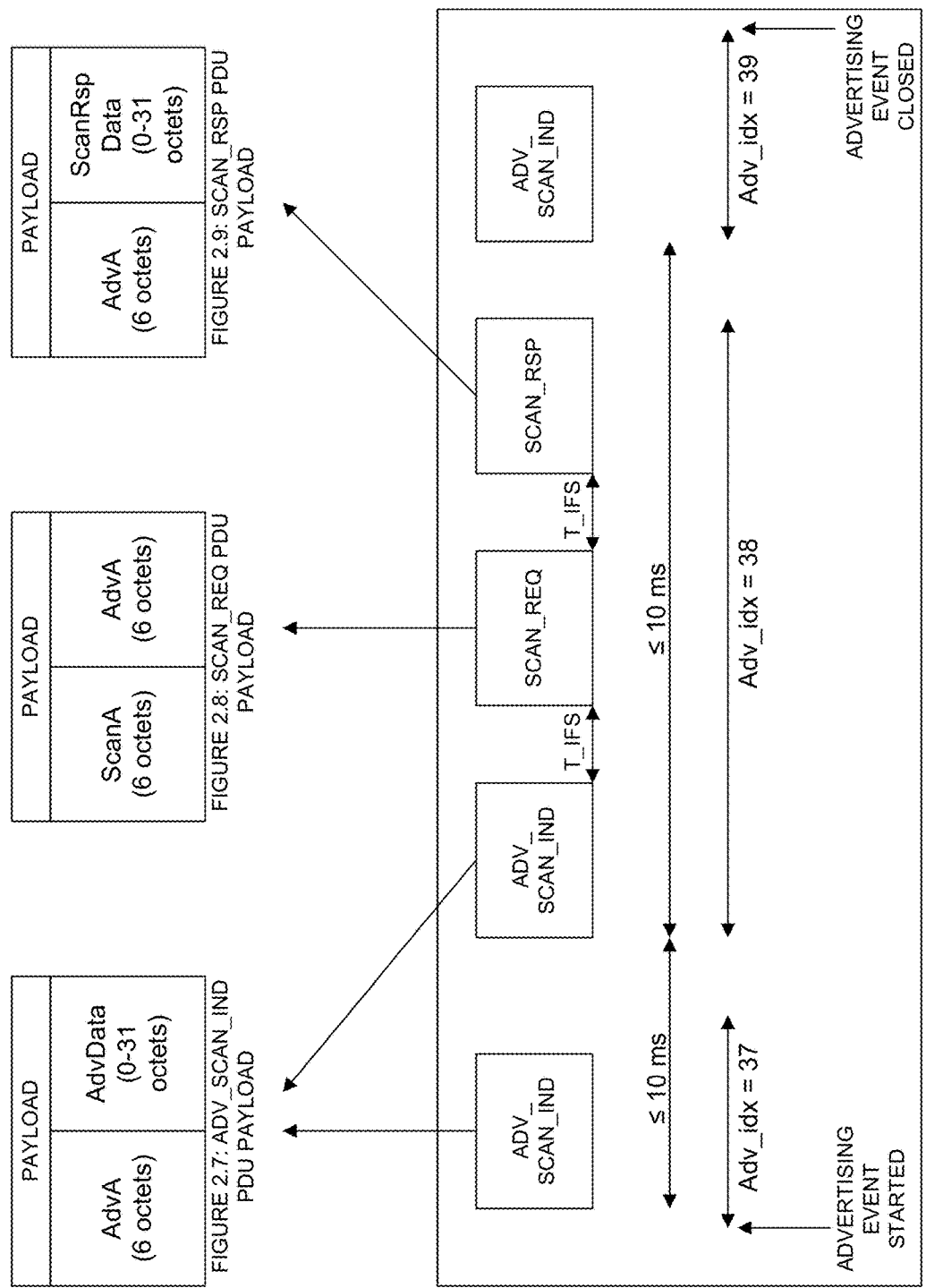
FIG. 6 illustrates an example internal structure of BTLE advertising packets, scan request packets, and scan response packets.
Figure 12:
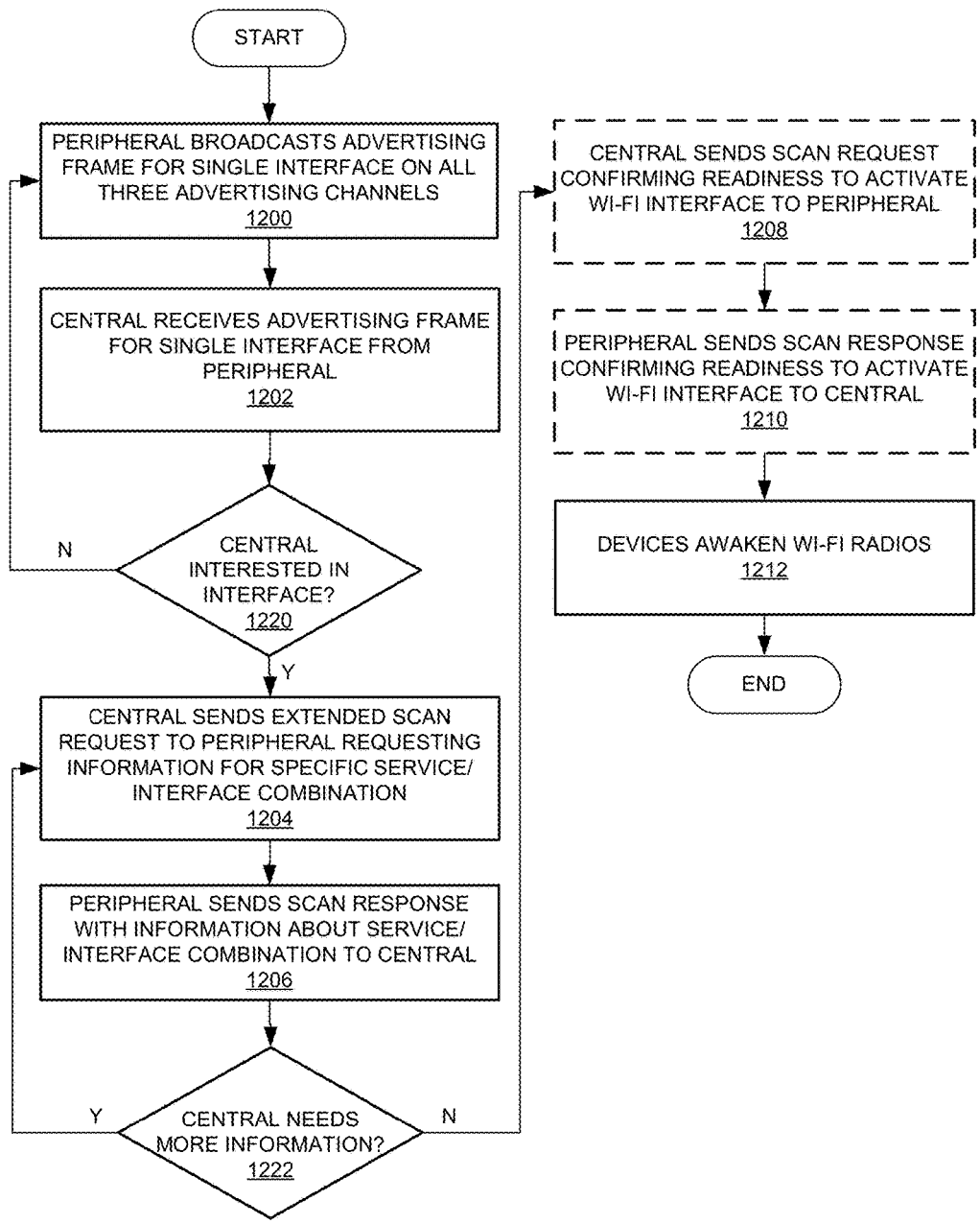
FIG. 12 presents a flowchart illustrating an example process of using extended scan request frames to exchange service/interface information.
Figure 13:
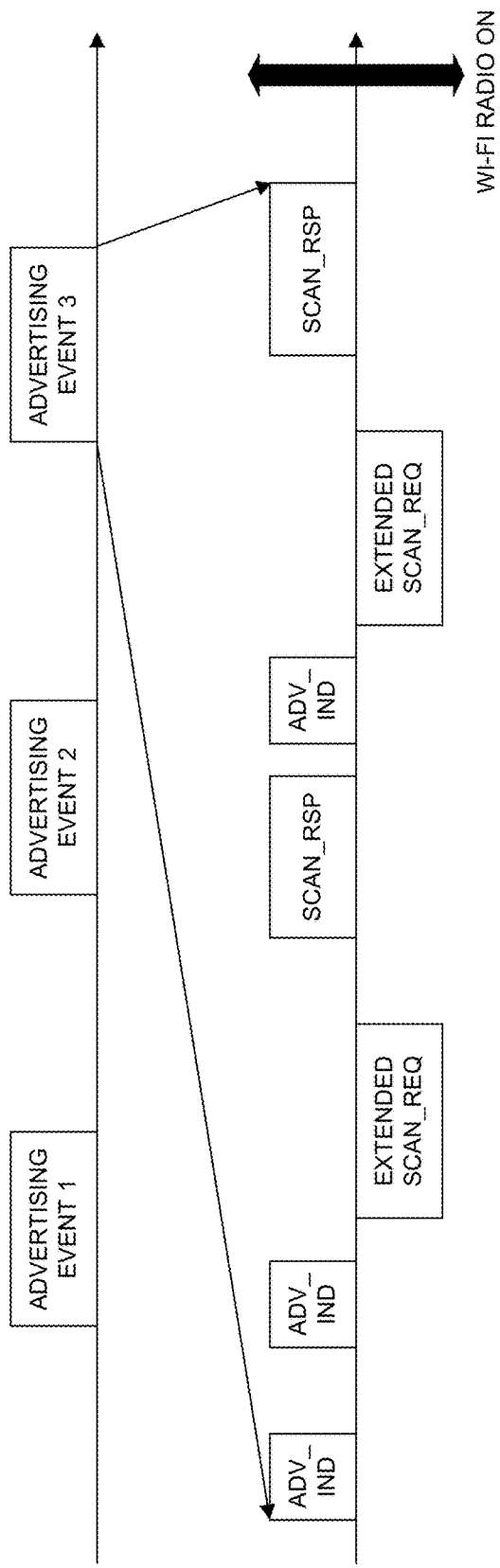
FIG. 13 illustrates an example sequence of extended scan request frames within an advertising event.
Figure 14:
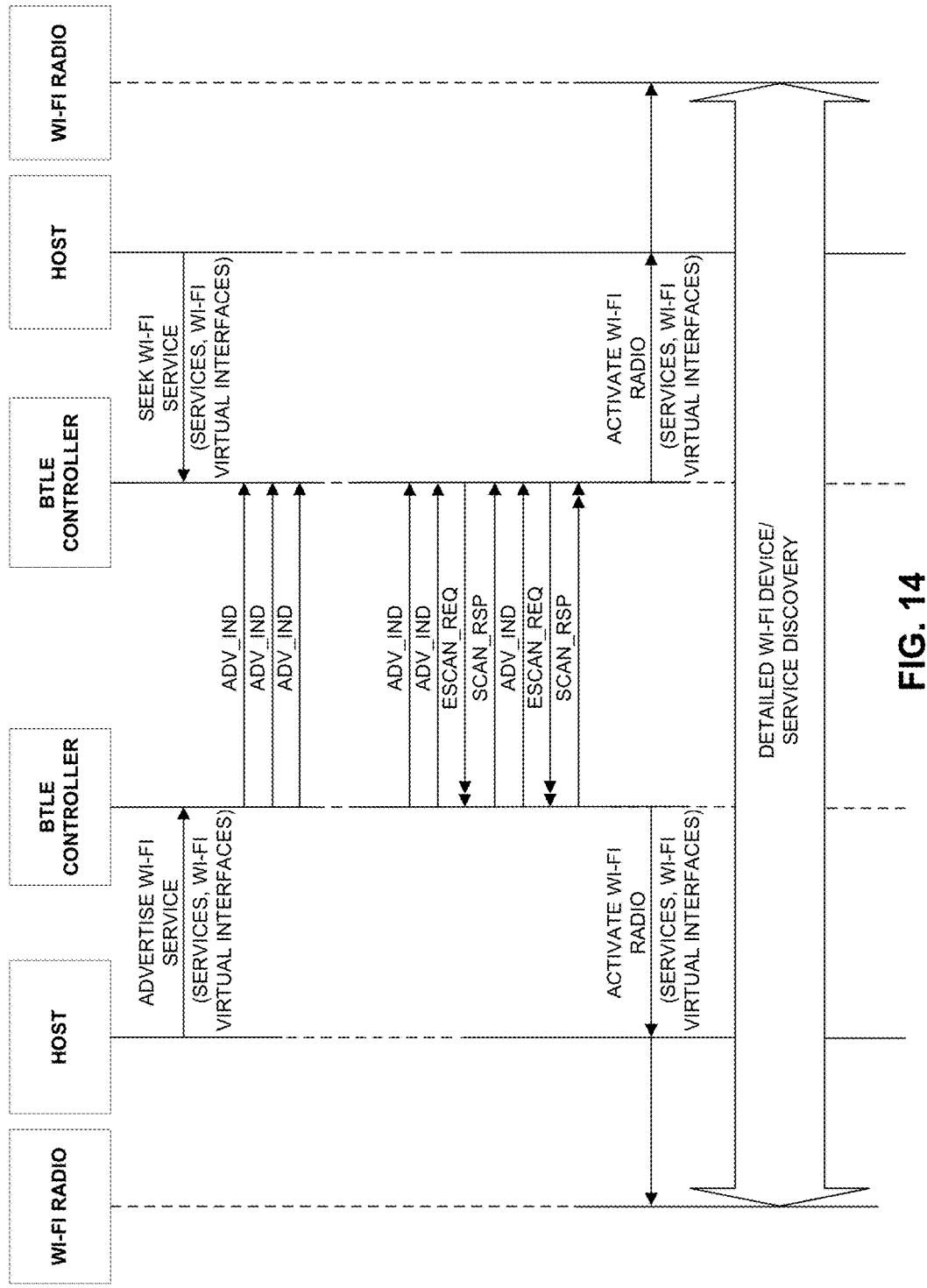
FIG. 14 presents an event diagram illustrating an example process of using extended scan request frames to exchange service/interface information.
Figure 15:
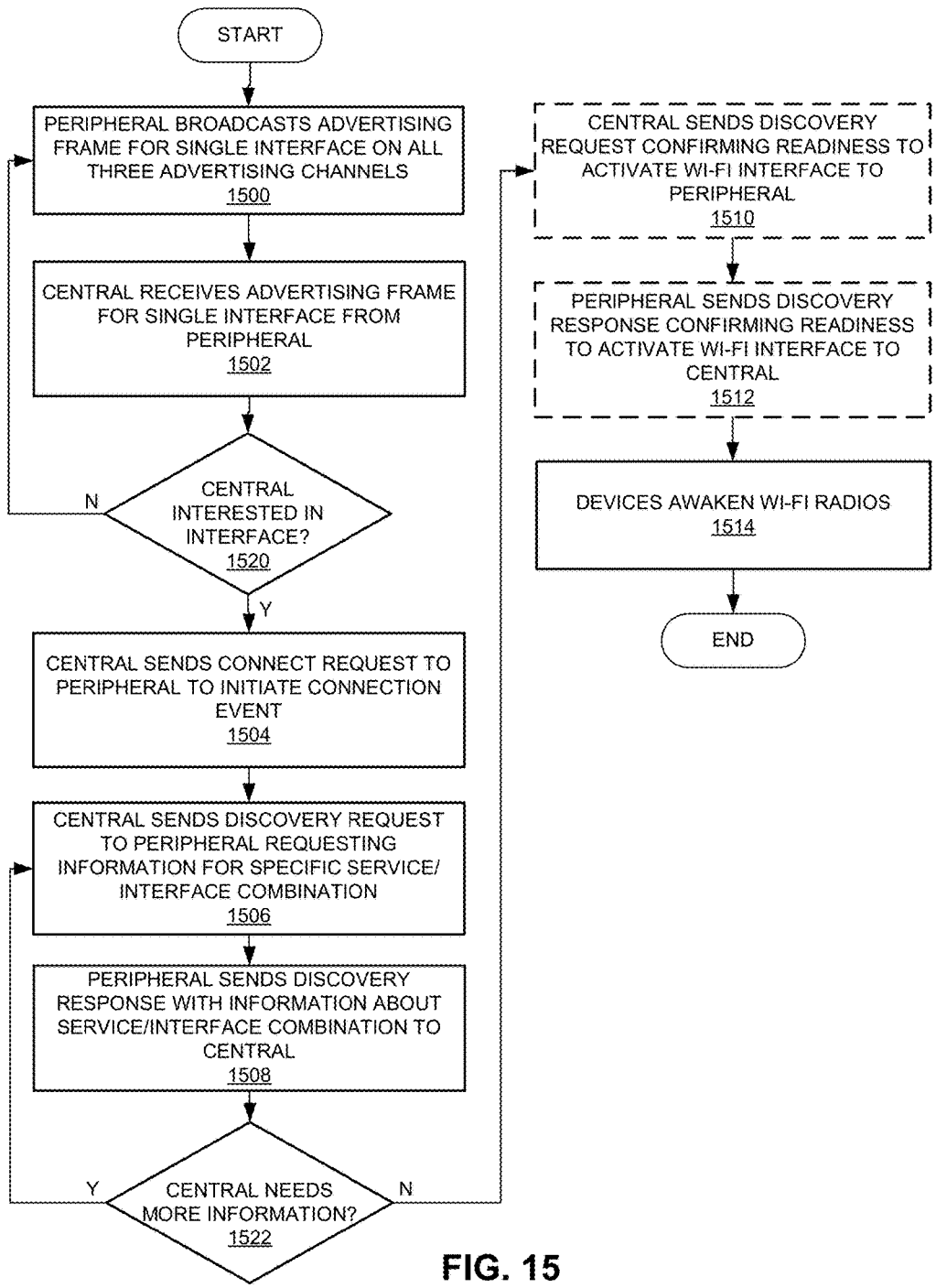
FIG. 15 presents a flowchart illustrating an example process of using a connection event to exchange service/interface information.
Figure 16:
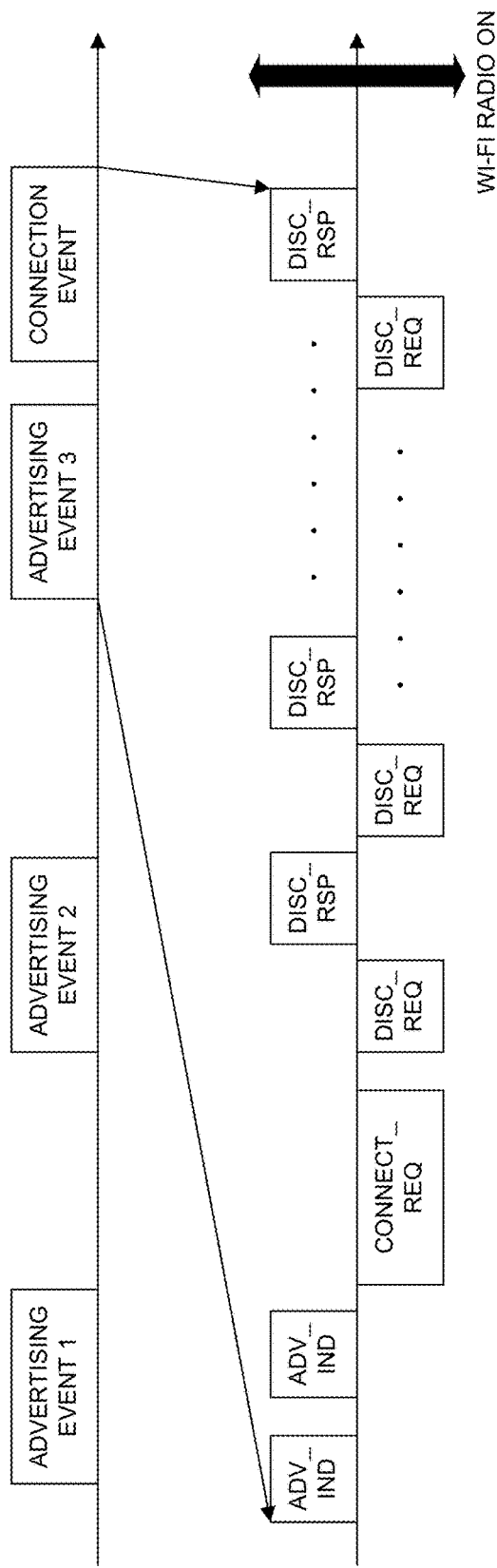
FIG. 16 illustrates BTLE frames within an example advertising event and an example connection event.
Figure 17:
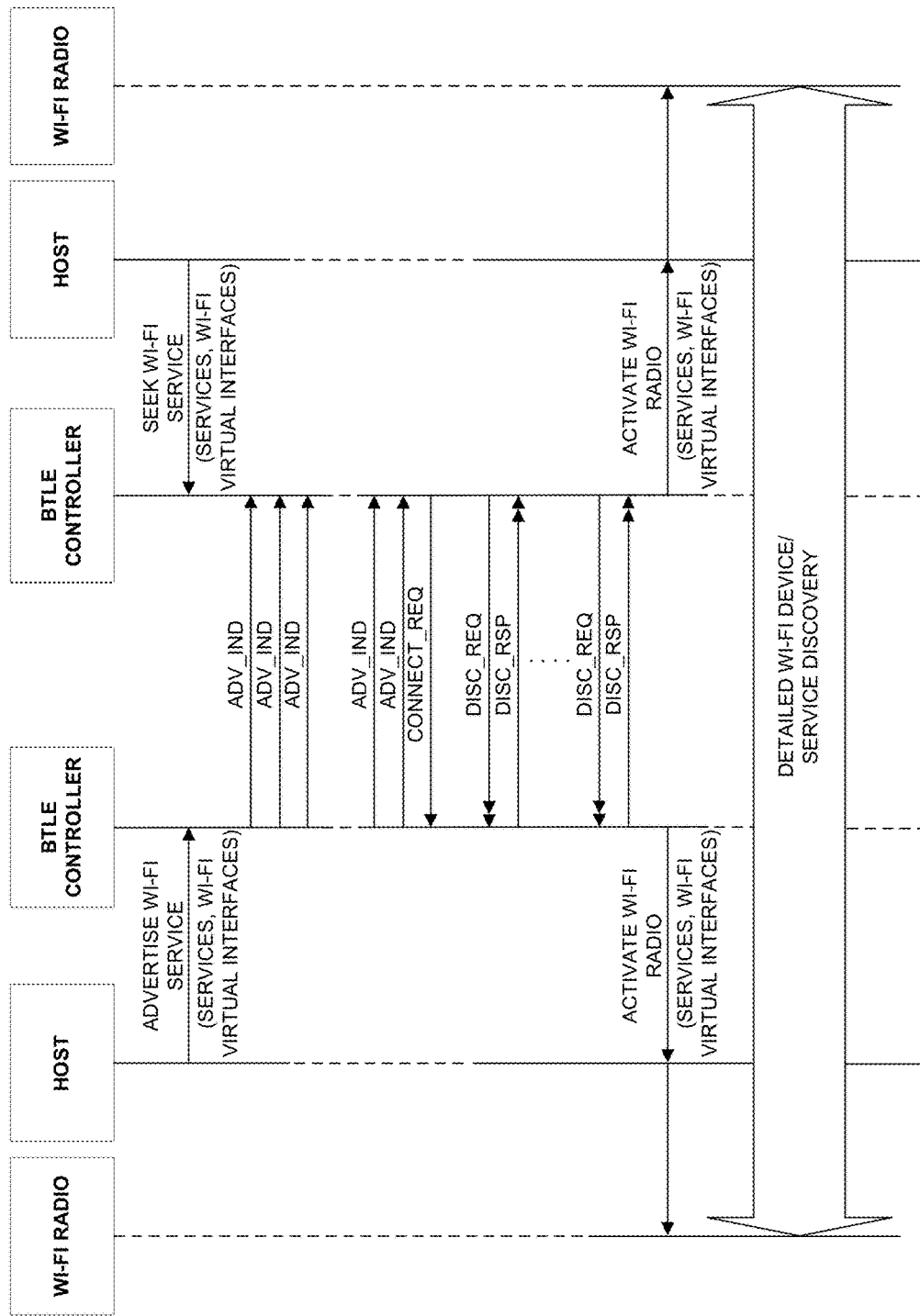
FIG. 17 presents an event diagram illustrating an example process of using a connection event to exchange service/interface information.

One issue with using BTLE link-layer communication to exchange service information and virtual network interface information has to do with the size of frames used in BTLE link-layer communications. FIG. 6 discloses maximum payload sizes provided by advertising frames, scan request frames, and scan response frames. BTLE link-layer frames can provide a maximum payload of, e.g., 31 bytes. Furthermore, scan request frames may only provide enough space for, e.g., two address fields. To address this issue, three different methods of efficiently transferring the service/interface data using BTLE link-layer frames are presented in detail. FIGS. 7-11 provide examples of using unmodified advertising frames, request frames, and response frames within a BTLE exchange to initialize a Wi-Fi connection. FIGS. 12-14 provide examples of using extended request frames within a BTLE exchange to initialize a Wi-Fi connection. FIGS. 15-17 provide examples of using a BTLE connection event to initialize a Wi-Fi connection.

Returning to the example depicted in FIG. 3, once the service information and virtual network interface information is exchanged between devices 110 and 120, peripheral device 110 wakes up processor 140, turns on its Wi-Fi radio interface, and enables NAN interface 132. Central device 120 wakes up processor 142, turns on its Wi-Fi radio interface, and enables NAN interface 138 (operation 308). Devices 110 and 120 then transition to new roles in the resulting Wi-Fi-based network. In some embodiments, the peripheral/slave device can become the Wi-Fi network's master device, while the central/master device can become a slave device. In other embodiments, the central/master device can become the Wi-Fi network's master device, while the peripheral/slave device can become the slave device in the Wi-Fi network.

Figure 1C:
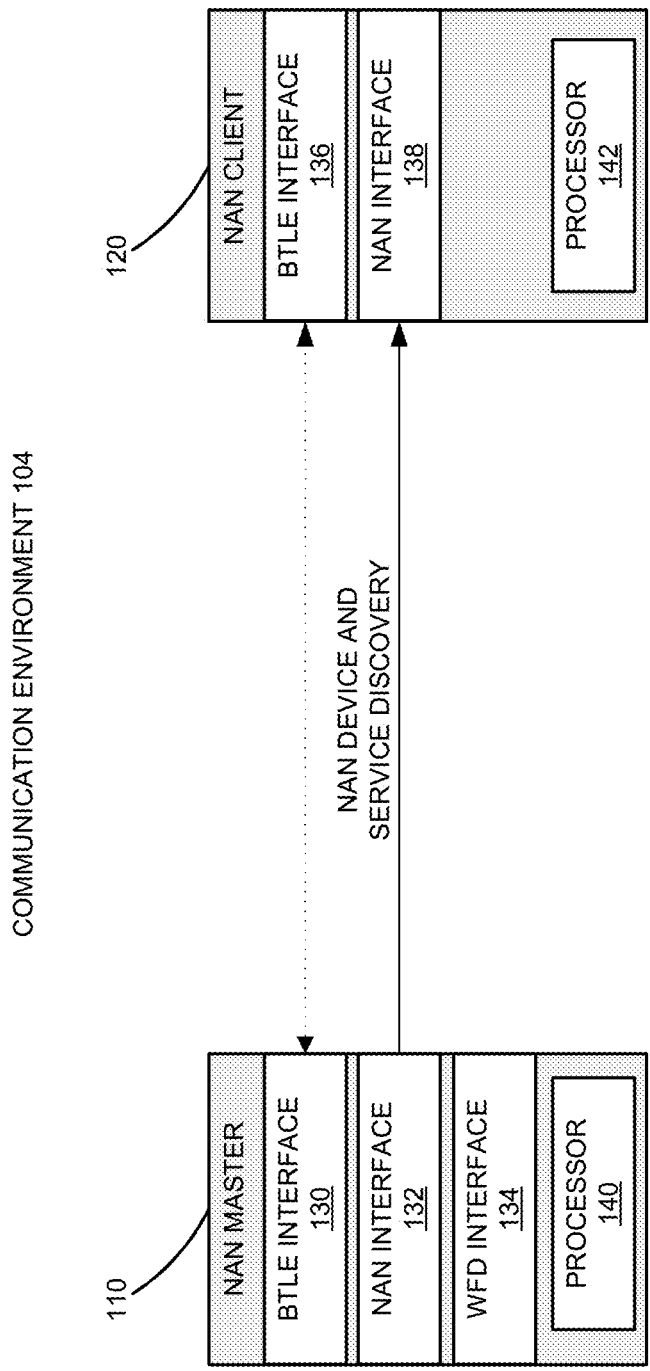
FIG. 1C illustrates an example communication environment.

FIG. 1C illustrates the states of devices 110 and 120 after the devices have activated their Wi-Fi radios interfaces. When NAN interface 132 is enabled, peripheral device 110 may automatically become the NAN master of the resulting NAN network and begin to transmit sync and discovery beacons on NAN social channels. Meanwhile, central device 120 may begin to scan NAN social channels for a NAN network to join. Central device 120 may more quickly detect and connect to the resulting NAN network due to information received during BTLE exchanges with peripheral device 110.

Figure 1D:
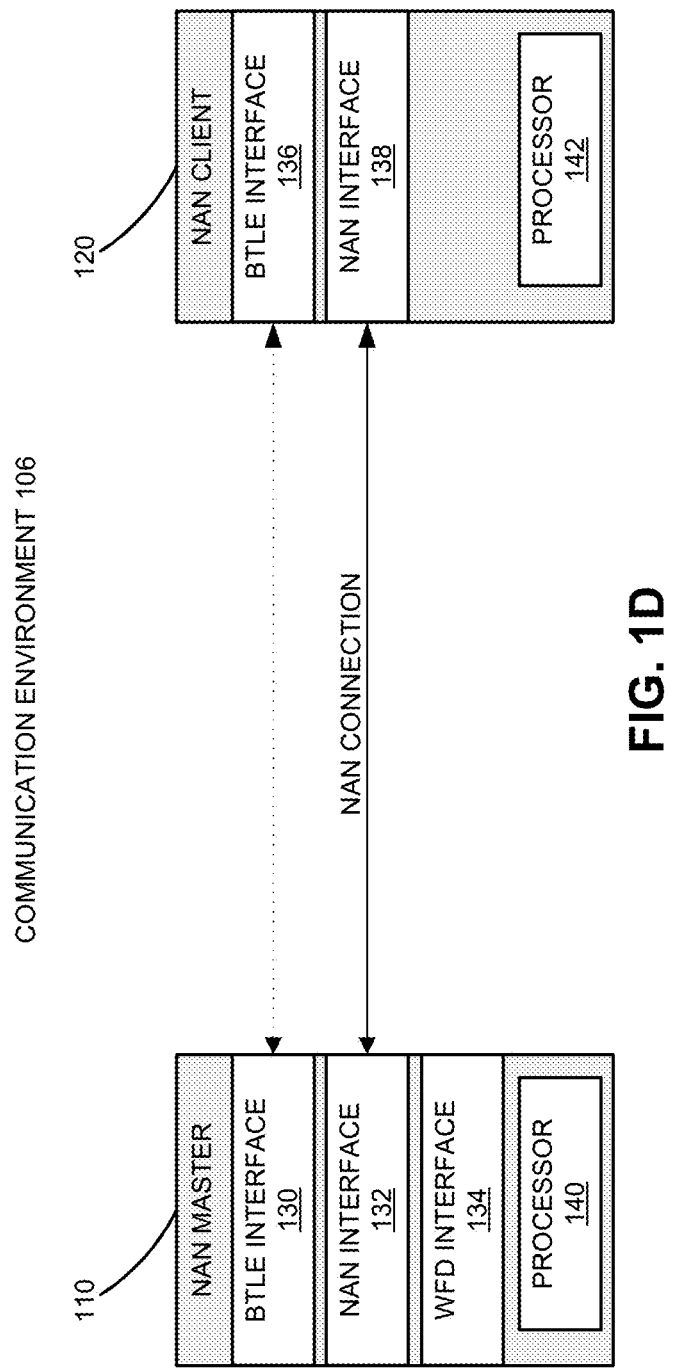
FIG. 1D illustrates an example communication environment.

Next, as illustrated in FIG. 1D, central device 120 can join peripheral device 110's NAN network and benefit from the Wi-Fi connection's higher throughput while accessing peripheral device 110's service (operation 310). It should be noted that if central device 120 fails to discover peripheral device 110's NAN network, central device 120 can automatically start its own NAN network after a period of time. U.S. patent application Ser. No. 13/913,278, entitled "Method and Apparatus for Cooperative Channel Switching" and filed 17 Jun. 2013, discloses systems and methods for detecting a NAN network, interacting with a NAN network, and negotiating with the NAN network to become the network's master, and is incorporated herein by reference in its entirety.

In other embodiments where both the central device and the peripheral device possess WFD interfaces, the peripheral device can create a new WFD network as an autonomous Group Owner and begin transmitting beacons. By communicating with the peripheral device over the BTLE protocol, the central device already knows the new WFD network's operation channel. Thus, the central device begins scanning for the peripheral device's WFD network on that channel as a P2P device and quickly joins the WFD network.

Low-Power Initialization with Unmodified Frames

Figure 7:
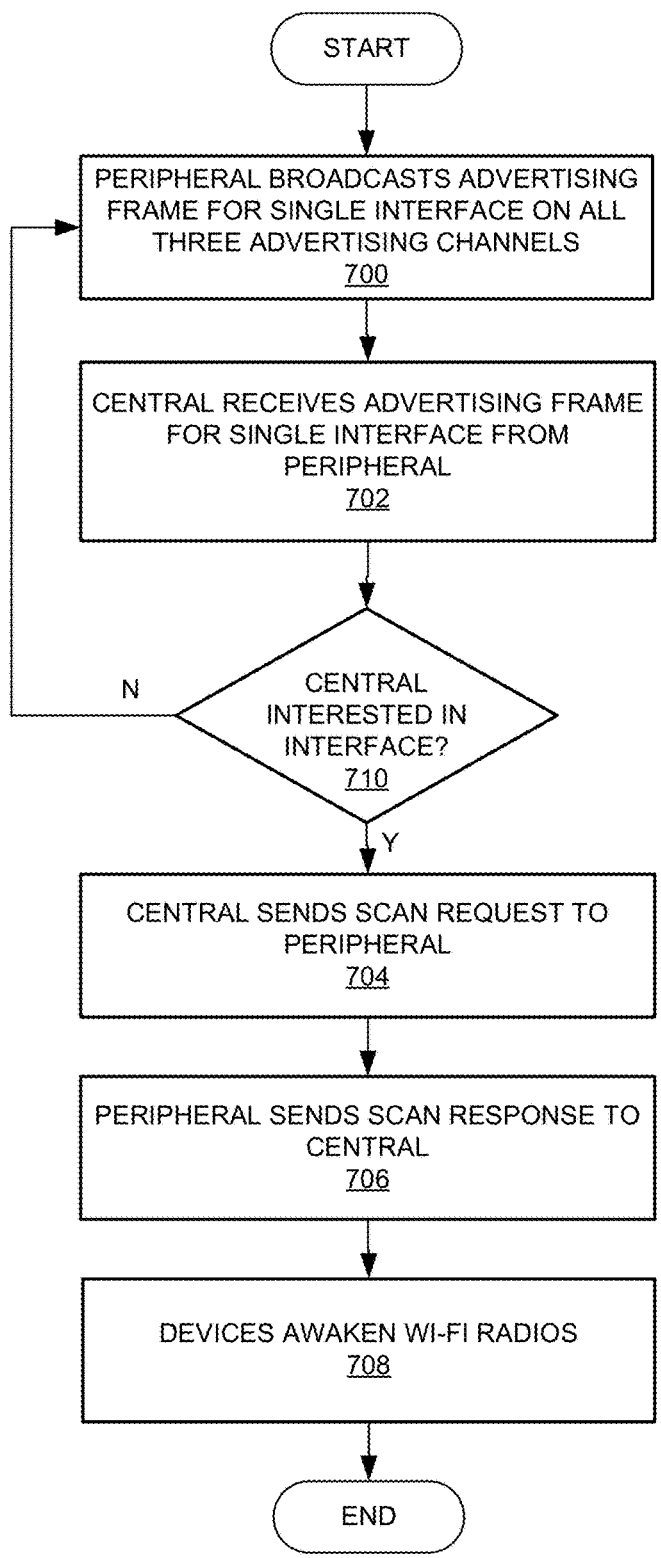
FIG. 7 presents a flowchart illustrating an example process of using unmodified BTLE frames to exchange service/interface information with a single-round handshake.
Figure 8:
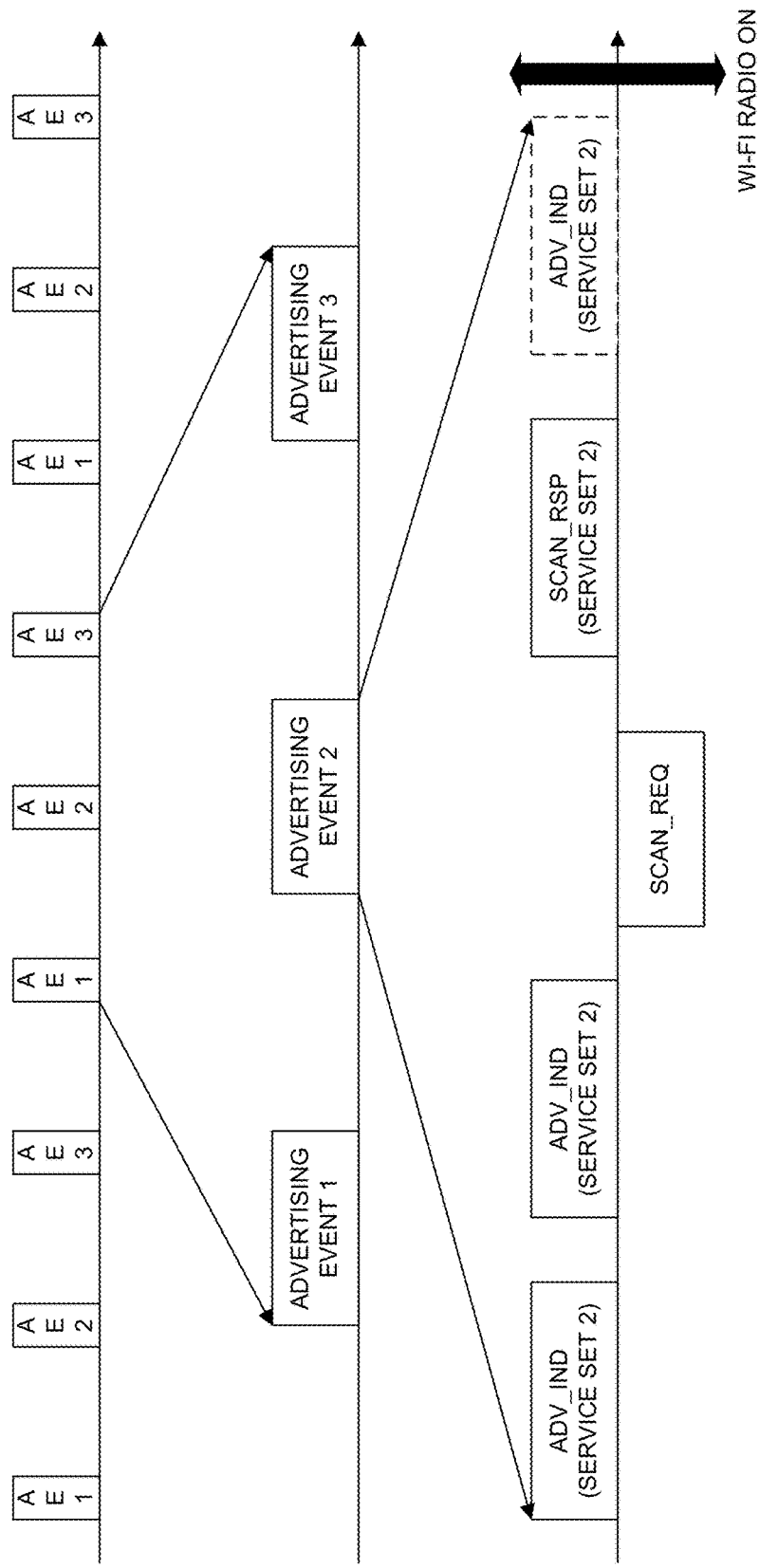
FIG. 8 illustrates an example sequence of unmodified BTLE frames within an advertising event.
Figure 9:
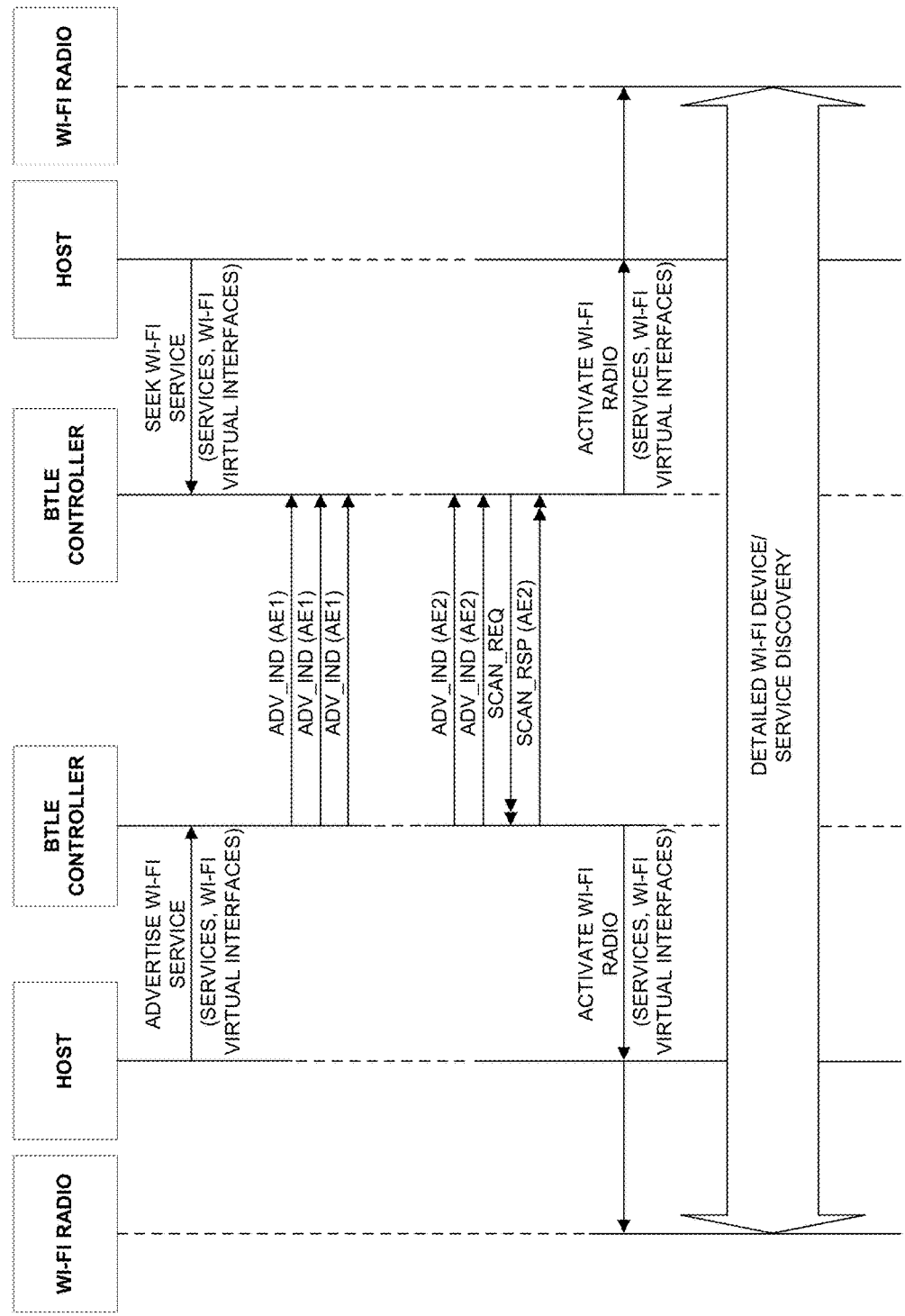
FIG. 9 presents an event diagram illustrating an example process of using unmodified BTLE frames to exchange service/interface information with a single round handshake.
Figure 10:
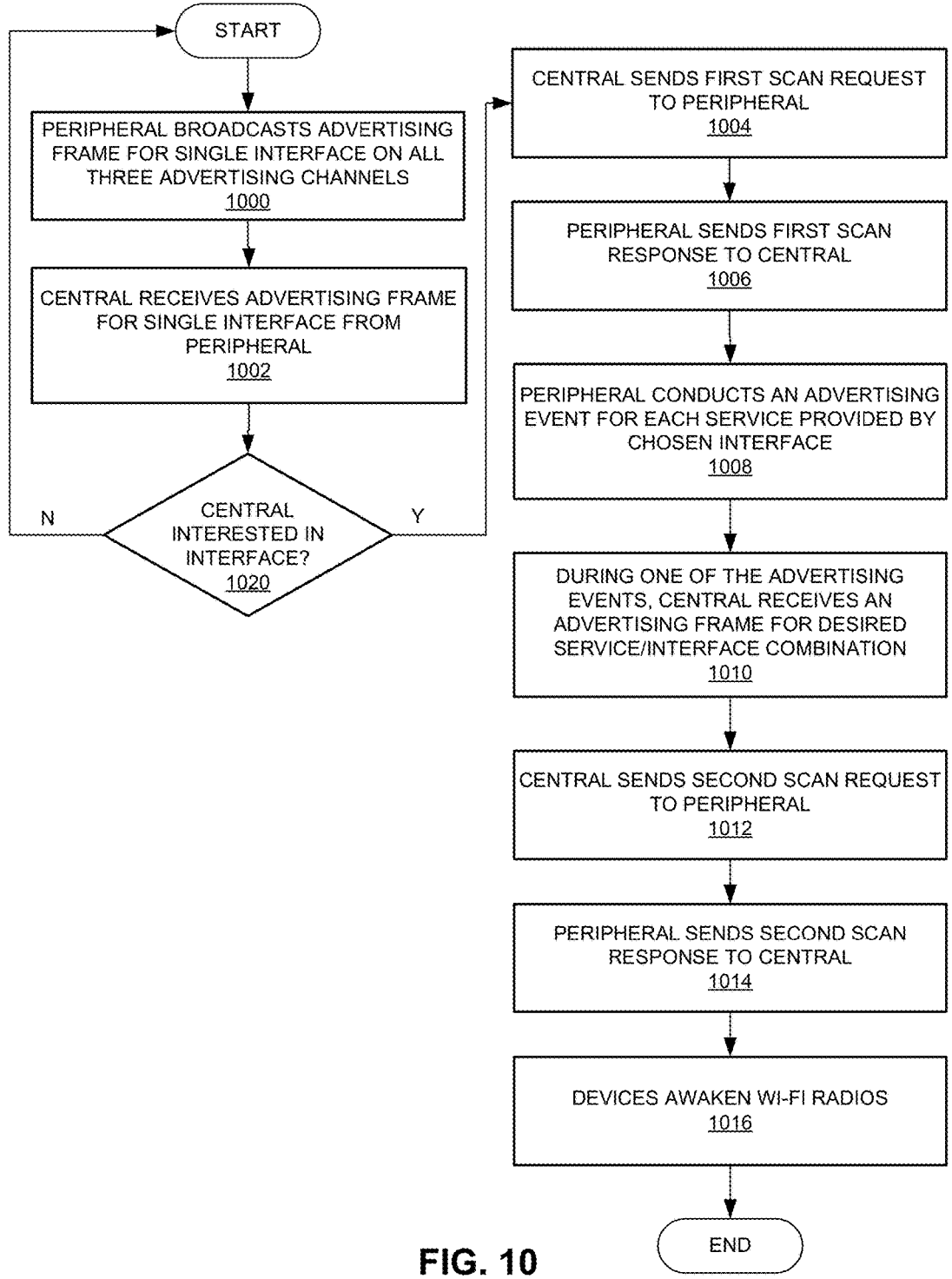
FIG. 10 presents a flowchart illustrating an example process of using unmodified BTLE frames to exchange service/interface information with a two-round handshake.
Figure 11:
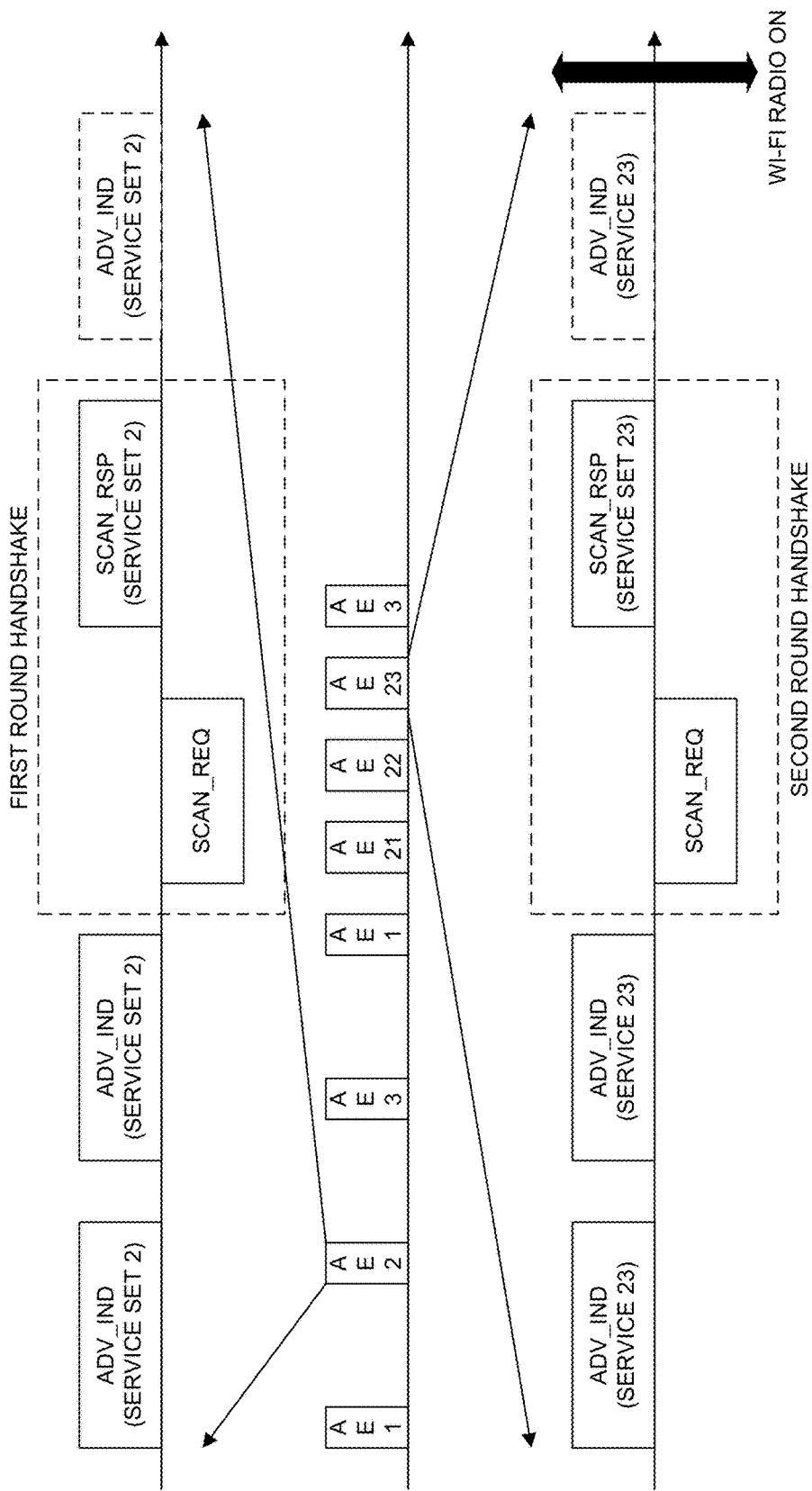
FIG. 11 illustrates an example sequence of unmodified BTLE frames in a two-round handshake.

FIGS. 7-11 disclose examples of using unmodified advertising frames, request frames, and responses to communicate service and interface information between a central device and a peripheral device during low-power initialization of a high-power connection. FIGS. 7-9 illustrate an implementation of the above that uses a single-round scan request/scan response handshake, while FIGS. 10-11 illustrate an implementation that uses a two-round scan request/scan response handshake.

As illustrated in communication environment 102 of FIG. 1B, peripheral device 110 and central device 120 have turned off their Wi-Fi radios and suspended their processors. Peripheral device 110 can offer three different services: a first service with a first service ID, a second service with a second service ID, and a third service with a third service ID. Peripheral device 110 can possess two virtual network interfaces: NAN interface 132 and WFD interface 134, wherein both virtual network interfaces provide all three services mentioned above. It should be noted that in some embodiments, a virtual network interface of a peripheral device may only provide a subset of all the services provided by the peripheral device.

Because peripheral device 110 can possess two virtual network interfaces that are each able to provide the three services, peripheral device 110 can have six service/interface combinations to advertise within its advertising frames. Because advertising frames can provide a maximum payload of, e.g., 31 bytes, and because each service ID can take up, e.g., six bytes, peripheral device 110 may not be able to advertise all service/interface combinations within a single advertising frame. Therefore, peripheral device 110 can have each advertising frame advertise the services provided by a single virtual network interface. Each subsequent advertising frame broadcast can focus on a different virtual network interface provided by the device before cycling back to the first virtual network interface. For example, peripheral device 110 can possess two virtual network interfaces: NAN interface 132 and WFD interface 134. Peripheral device 110 can issue a first advertising frame that advertises services provided through NAN interface 132, a second advertising frame that advertises services provided through WFD interface 134, and a third advertising frame that advertises services provided through NAN interface 132. It should be noted that a peripheral device can advertise virtual network interfaces at different frequencies. For example, if peripheral device 110 determines that services provided through NAN interface 132 need to be advertised more often than services provided through WFD interface 134, peripheral device 110 can advertise NAN interface 132, e.g., four times for every time WFD interface 134 is advertised.

In situations where the central device is interested in subscribing to peripheral device 110's services through WFD interface 134, peripheral device 110's decision to advertise WFD interface 134 less often may delay the central device's subscription. To remedy this issue, peripheral device 110 can place within each advertising frame, an indication of when peripheral device 110 can conduct an advertising event that focuses on a different virtual network interface. Returning now to the above example, suppose peripheral device 110, which conducts advertising events every, e.g., five seconds, just finished an advertising event that focused on WFD interface 134. The next advertising frame that peripheral device 110 broadcasts can indicate that, e.g., 20 seconds from now, peripheral device 110 can conduct an advertising event that focuses on WFD interface 134. When the central device that is interested in a WFD-provided service receives this advertising frame, the central device can suspend its Bluetooth radio for, e.g., 20 seconds to conserve power.

Aside from the above indication, advertising frames also contain an indication of the currently advertised virtual network interface as well as a service ID list that describes services provided by the virtual network interface. In some embodiments, advertising frames can substitute the list of service IDs with a hash of service IDs that is created using Supported Service Type Hash (SSTH). In other embodiments, advertising frames can substitute the list of service IDs with a bloom filter of the service IDs.

FIG. 7 provides a flowchart that explains how devices 110 and 120 can communicate over the course of several advertising events with unmodified frames using a single round scan request/scan response handshake. During a first advertising event, peripheral device 110 broadcasts advertising frames advertising WFD interface 134's service set on advertising channels 37, 38, and 39 (operation 700). Central device 120, which is scanning on one of these channels, can receive one of the advertising frames (operation 702). Central device 120 then checks the advertising frame's virtual network interface indication, determining that the advertising frame is advertising services provided through a WFD interface. Because central device 120 only possesses NAN interface 138, central device 120 may not be interested in the WFD interface and may not respond to the advertising frame (decision 710). Peripheral device 110, having received no responses, can finish the advertising event.

In a subsequent advertising event, peripheral device 110 advertises services provided through NAN interface 132 by broadcasting another set of advertising frames (operation 700). Central device 120 can receive one of the advertising frames on the channel it is scanning on (operation 702). This time, central device 120 finds that it is interested in the virtual network interface advertised by the advertising frame (decision 710). Central device 120 then can transmit a scan request frame to peripheral device 110, which contains central device 120's MAC address as the source address and peripheral device 110's MAC address as the destination MAC address (operation 704). After receiving the scan request frame from central device 120, peripheral device 110 can send a scan response frame to central device 120. The scan response frame can contain detailed information about NAN interface 132, including the interface's address, the interface's preferred NAN channel, and a time duration indicating when the NAN interface will be available after peripheral device 110's Wi-Fi radio is switched on (operation 706). Next, devices 110 and 120 can switch on their respective Wi-Fi radios and proceed to form a NAN network (operation 708).

FIGS. 8 and 9 illustrate an example of how a peripheral device can communicate with a central device with unmodified frames using a single-round scan request/scan response handshake. As shown in the middle row of FIG. 8, the peripheral device can possess three different virtual network interfaces and advertises a first interface during advertising event 1, a second interface during advertising event 2, and a third interface during advertising event 3. As shown in the top row of FIG. 8, the peripheral device can rotate among advertising the three virtual network interfaces sequentially. As shown in the bottom row of FIG. 8, the peripheral device can broadcast three advertising frames during each advertising event. Additionally, a central device may have responded to the second advertising frame broadcast during advertising event 2. The result of the communication between the peripheral device and the central device during advertising event 2 may lead to both devices activating their Wi-Fi radios a short time after the end of advertising event 2 to form a Wi-Fi-based connection.

One disadvantage with the single-round scan request/scan response handshake described in FIGS. 7-9 is that once a peripheral device has received a scan request frame from a central device that is ostensibly interested in one of its services, after sending a scan response frame that contains additional information about its services, the peripheral device can switch on its Wi-Fi radio without any confirmation from the central device. However, if the central device decides, based on the additional information received in the scan response, not to subscribe to the peripheral device's service, the central device may not have a way of communicating its decision to the peripheral device. Thus, after switching on its Wi-Fi radio interface, the peripheral device uses power while waiting for the central device to connect to its Wi-Fi network. One modification to the procedure described in FIGS. 7-9 involves a two-round scan request/scan response handshake that takes place over the course of two advertising events.

FIG. 10 provides a flowchart that explains how devices 110 and 120 can communicate over the course of several advertising events using unmodified frames and a two-round scan request/scan response handshake. During the first-round advertising event, peripheral device 110 can advertise services provided through NAN interface 132 by broadcasting advertising frames across BTLE advertising channels 37, 38, and 39 (operation 1000). Central device 120 can receive one of the advertising frames on the channel it is scanning (operation 1002). Central device 120 can decide that it is interested in the virtual network interface advertised by the advertising frame (decision 1020). Central device 120 can transmit a first scan request frame to peripheral device 110, which contains central device 120's MAC address as the source address and peripheral device 110's MAC address as the destination MAC address (operation 1004). After receiving the scan request frame from central device 120, peripheral device 110 can send a first scan response frame to central device 120, which (1) contains instructions telling central device 120 to scan for another advertising frame during a second-round advertising event and (2) indicates the starting time and duration of the second-round advertising event (operation 1006). The scan response frame can contain additional information about the currently advertised service set.

Once it is time for peripheral device 110 to advertise the same service for the second-round, peripheral device 110 can either (1) conduct a single advertising event as normal, wherein each broadcast advertising frame contains more detailed information about the current service set, or (2) conduct multiple "sub-events" spawned from the first-round event, wherein each sub-event advertises a single service of the service set advertised during the first-round event (operation 1008). Because peripheral device 110 is able to instruct central device 120 to listen for advertising frames at arbitrary times, peripheral device 110 may conduct these sub-events closer together in time. During one of the sub-events, central device 120 receives an advertising frame that contains detailed information regarding the service/interface combination it is interested in (1010). The second-round advertising frame can contain information that would normally be found in a scan response frame sent in FIG. 7, such as the interface's address, the interface's preferred NAN channel, and a time duration indicating when the interface will be available after peripheral device 110's Wi-Fi radio is switched on. Now, central device 120 may be able to confirm to peripheral device 110 that it wants to subscribe to this service/interface combination by transmitting a second-round scan request frame to peripheral device 110 (operation 1012). In response, peripheral device 110 can confirm that both devices are ready to turn on their Wi-Fi radios by sending a second-round scan response frame to central device 120 (operation 1014). It should be noted that the second-round scan response frame can contain detailed interface information that may assist central device 120 in finding the NAN network that peripheral device 110 plans to create. Next, devices 110 and 120 switch on their respective Wi-Fi radios and proceed to form a NAN network (operation 1016). Because peripheral device 110 has the option of not switching on its Wi-Fi radio if it does not receive a second-round scan request frame from central device 120, the two-round scan request/scan response handshake can help peripheral device 110 conserve power.

FIG. 11 provides an example timeline of how a peripheral device communicates with a central device with unmodified frames using a two-round scan request/scan response handshake. As shown in the middle row of FIG. 11, the peripheral device can possess three different virtual network interfaces and can advertise a first interface during advertising event 1 (AE1), a second interface during advertising event 2 (AE2), and a third interface during advertising event 3 (AE3). As shown in the top row of FIG. 11, the peripheral device can broadcast three advertising frames during each advertising event 2. A central device can respond to the second advertising frame, which results in the first-round scan request/scan response exchange between the devices. The middle row of FIG. 11 shows the peripheral device spawning three sub-events within the time period during which the peripheral device would normally advertise its second interface's service set. The first sub-event (AE21) can advertise a combination of the second interface and a first service, the second sub-event (AE22) can advertise a combination of the second interface and a second service, and the third sub-event (AE23) can advertise a combination of the second interface and a third service. As shown in the bottom row of FIG. 11, because the central device is interested in subscribing to the third service through the second interface, the central device can respond to the third sub-event, resulting in the second-round scan request/scan response exchange between the devices. Next, the result of the second-round exchange results in both devices activating their Wi-Fi radios shortly after the end of the third sub-event and forming a Wi-Fi-based connection.

In some embodiments, both the peripheral device and the central device can alternate between periods of conducting advertising events and scanning periods. For example, after receiving the second-round scan response frame, the central device can begin conducting advertising events while the peripheral device can begin scanning. The central device can broadcast its own advertising frames, wherein the central device's advertising frames convey information about the central device's desired service/interface combination to the peripheral device. The peripheral device can transmit a scan request frame to the central device, who responds with a scan response frame. Then, both devices activate their Wi-Fi radios to form a Wi-Fi-based connection.

Low-Power Initialization with Extended Frames

FIGS. 12-14 illustrate the use of extended request frames to communicate service and interface information between a central device and a peripheral device during low-power initialization of a high-power connection.

Using communication environment 102 of FIG. 1B as an example, peripheral device 110 and central device 120 have turned off their Wi-Fi radios and suspended their processors. For purposes of this example, peripheral device 110 can offer three different services: a first service with a first service ID, a second service with a second service ID, and a third service with a third service ID. Peripheral device 110 can also possess two virtual network interfaces: NAN interface 132 and WFD interface 134, wherein both virtual network interfaces provide all three services mentioned above.

As mentioned above, the small payloads provided by BTLE link-layer frames may impose a constraint on the speed of transferring service and interface information from a peripheral device to a central device. For example, a standard scan request frame may possess only enough payload space for, e.g., two MAC addresses. When a peripheral device receives a scan request frame from a central device, the peripheral device may only deduce (1) the frame's source from the source MAC address stored in the frame, and (2) the frame's intended destination from the destination MAC address stored in the frame. In other words, a scan request frame may be unable to convey, to the peripheral device, information related to what service/interface combination the central device wants.

In some embodiments, a central device can transmit "extended" scan request frames. The payload of an extended scan request frame is up to, e.g., 25 bytes more than that of a standard scan request frame. As a result, a central device can transmit the following extra information via an extended scan request frame: (1) an indication of which service/interface combination the central device is interested in, and (2) a request for more detailed information about the combination such as the service's ID/name, the interface's type, capabilities, preferred channel, availability time, and other connection parameters of the Wi-Fi network that is to be created. In doing so, the central device can inform a peripheral device of the service/interface that the central device is interested via a single frame, thereby enabling the peripheral device to transmit a scan response frame with information specific to the service/interface combination. Extended frames can enable a central device and a peripheral device to exchange information about the service/interface combination and confirm to each other that both devices can switch on their Wi-Fi radios within the course of a single advertising event.

FIG. 12 provides a flowchart that illustrates an example of how devices 110 and 120 can communicate over the course of a single advertising event using extended scan request frames. During an advertising event, peripheral device 110 can broadcast advertising frames, which advertise NAN interface 132's service set on advertising channels 37, 38, and 39 (operation 1200). Central device 120, which may be scanning on one of these channels, can receive one of the advertising frames (operation 1202) and determine that it is interested in one of the services of the advertised service set (decision 1220). Central device 120 can transmit an extended scan request frame to the peripheral device, which can contain (1) central device 120's MAC address as the source address, (2) peripheral device 110's MAC address as the destination MAC address, and (3) a request for more information regarding the second service provided by NAN interface 132, wherein the request contains the second service ID and NAN interface 132's interface index (operation 1204). Peripheral device 110 can respond to central device 120 with a standard scan response frame, which can contain detailed information about the second service provided by NAN interface 132 (operation 1206). If, after receiving the scan response frame, central device 120 still requires more information about the second service (decision 1222), central device 120 can send another extended scan request frame that contains a request for more information regarding the second service (operation 1204). Peripheral device 110 can then respond with yet another scan response frame (operation 1206). It should be noted that this frame exchange and subsequent frame exchanges can take place within the course of the same advertising event or a subsequent advertising event.

If the first scan response frame contained all the information needed by central device 120 to subscribe to the second service provided through NAN interface 132, central device 120 can transmit a extended scan request frame to confirm that it is ready to switch on its Wi-Fi radio interface (optional operation 1208). The extended scan request frame can contain detailed information about NAN interface 138, such as the interface's availability time, MAC address, preferred channel, role, and other connection parameters of the Wi-Fi network that is to be created. In response, peripheral device 120 can transmit a scan response frame to confirm that it is ready to switch on its Wi-Fi radio interfaces (optional operation 1210). Next, devices 110 and 120 switch on their respective Wi-Fi radio interfaces and form a NAN network (operation 1212).

FIGS. 13 and 14 illustrate how a peripheral device communicates with a central device using extended frames. As shown in the top row of FIG. 13, the peripheral device possesses three different virtual network interfaces and advertises a first interface during advertising event 1, a second interface during advertising event 2, and a third interface during advertising event 3. As shown in the bottom row of FIG. 13, the peripheral device broadcasts three advertising frames during each advertising event. After the second advertising frame of advertising event 3 is broadcast, the central device and the peripheral device can exchange a first extended scan request frame and a first scan response. After waiting for the peripheral device to broadcast the third advertising frame for advertising event 3, the central device can send another extended scan request frame to the peripheral device. The peripheral device can respond with another scan response frame, which confirms that both devices are ready to switch on their Wi-Fi radio interfaces. Next, both devices can activate their Wi-Fi radio interfaces to form a Wi-Fi-based connection.

In embodiments where the central device broadcasts advertising frames, a peripheral device can transmit extended scan request frames and the central device can also transmit extended scan response frames. The central device (which can be referred to as the service seeker) can broadcast an advertising frame that contains an indication of the service/interface combination sought by the central device. After receiving the advertising frame, the peripheral device (which can be referred to as service provider) determines whether it can provide this combination. If so, the peripheral device can transmit an extended scan request frame, which contains detailed information about the service/interface combination provided by the peripheral device, to the central device. In response, the central device can transmit a first extended scan response, which carries an indication that the central device wants to activate its Wi-Fi radio interface, to the peripheral device. In some embodiments, the extended scan response can contain connection parameters pertaining to the virtual network interface that central device plans to use to subscribe to the service. By storing these connection parameters, the peripheral device can more quickly discover the virtual network interface in the future.

Next, the peripheral device can respond with a second extended scan request to confirm the activation of its Wi-Fi radio interface and provide connection parameters pertaining to its virtual network interface. Next, the central device can respond with a second extended scan response to acknowledge the receipt of the second extended scan request.

Low-Power Initialization Via Connection Event

FIGS. 15-17 illustrate the use of a connection event to communicate service and interface information between a central device and a peripheral device during low-power initialization of a high-power connection.

As an example, communication environment 102 of FIG. 1B display peripheral device 110 and central device 120, which have turned off their Wi-Fi radios and suspended their processors. Peripheral device 110 can offer three different services: a first service with a first service ID, a second service with a second service ID, and a third service with a third service ID. Peripheral device 110 can possess two virtual network interfaces: NAN interface 132 and WFD interface 134, wherein both virtual network interfaces provide all three services mentioned above.

In some embodiments, a central device can establish a BTLE connection with a peripheral device by sending a connect request frame to the peripheral device. This starts a connection event between the two devices. The advantages of using a connection event to transmit service and interface information can include the following. First, devices that have formed a BTLE connection can move their communication to one of the 37 channels available for data transfer, thereby avoiding channel congestion. Second, the devices can exchange BTLE data frames, which can provide larger payloads than frames associated with advertising events. Next, the devices can exchange these frames more often. In some embodiments, the interval between data frame transmissions can be as low as 7.5 ms.

Some embodiments also define new types of data frames, discovery request (DISC_REQ) frame and discovery response (DISC_RSP) frame. In general, data frames exchanged via a BTLE radio interface are generated and processed in the interface's host device. Discovery request frames and discovery response frames can be generated and processed within the controller of the BTLE radio interface. Discovery request frames and discovery response frames can be link layer control frames that are generated and processed specifically at the link layer, which belongs to the controller of the BTLE radio interface. By using these new data frames to exchange service and interface information after forming a BTLE connection, the peripheral device and the central device that formed the BTLE connection can avoid getting layers of the host group of the BTLE stack involved, allowing their host processors to remain suspended. This may allow both devices to conserve power.

FIG. 15 provides a flowchart that illustrates an example process of how devices 110 and 120 can communicate during an advertising event and a connection event. It should be noted that the connection event can be conducted using the controller, without waking up the device's host processor. During an advertising event, peripheral device 110 can broadcast advertising frames advertising NAN interface 132's service set on the BTLE advertising channels (operation 1500). Central device 120, while scanning one of the advertising channels, can receive one of the advertising frames (operation 1502) and determine that it is interested in one of the services of the service set advertised (decision 1520). Central device 120 can then initiate a connection event by transmitting a connect request frame to the peripheral device (operation 1504). During the connection event, central device 120 can send a discovery request frame requesting more information regarding the second service provided by NAN interface 132, wherein the request contains the second service ID and NAN interface 132's interface index (operation 1506). Peripheral device 110 can respond with a discovery response frame, which can contain detailed information about the second service provided by NAN interface 132, to central device 120 (operation 1508). If, after receiving the discovery response frame, central device 120 still requires more information about the second service (decision 1522), central device 120 can send a another discovery request frame that contains a request for more information regarding the second service (operation 1506). Peripheral device 110 can respond with another discovery response frame (operation 1508). It should be noted that the generation, transmission, receipt, and processing of connect request frames, discovery request frames, discovery response frames can proceed at the controller level without waking up a host processor of any device.

If the first discovery response frame contains all the information needed by central device 120 to subscribe to the second service provided through NAN interface 132, central device 120 can transmit another discovery request frame to confirm that it is ready to switch on its Wi-Fi radio interface (optional operation 1510). This discovery request frame can contain detailed information about NAN interface 138, such as the interface's availability time, MAC address, preferred channel, role, and other connection parameters of the Wi-Fi network that is to be created. In response, peripheral device 120 can transmit another discovery response frame to confirm that both devices are ready to switch on their Wi-Fi radio interfaces (optional operation 1512). Next, devices 110 and 120 can switch on their Wi-Fi radio interfaces and form a NAN network (operation 1514).

FIGS. 16 and 17 illustrate how a peripheral device communicates with a central device during a connection event. As shown in the top row of FIG. 16, the peripheral device, which can possess three different virtual network interfaces, can advertise a first interface during advertising event 1, a second interface during advertising event 2, and a third interface during advertising event 3. As shown in the bottom row of FIG. 16, the peripheral device can broadcast three advertising frames during each advertising event. After the second advertising frame of advertising event 3 is broadcast, the central device can respond by sending a connect request frame and initiating a connection event. The connection event, which is shown as the right-most event in the top row of FIG. 16, can begin without waiting for advertising event 2 to finish. Returning to the bottom row of FIG. 16, the two devices can exchange a series of discovery request frames and discovery response frames. Next, both devices can activate their Wi-Fi radio interfaces after the last discovery response frame to form a Wi-Fi-based connection.

In embodiments where the central device is the one that broadcasts advertising frames, a peripheral device that receives an advertising frame can respond by transmitting a connection request frame to the central device. After initiating a connection event, the peripheral device can send information to the central device by transmitting discovery request frames while the central device can send information to the peripheral device by transmitting discovery response frames.

The environment in which some embodiments are executed may incorporate a general-purpose computer or a special-purpose device, such as a hand-held computer, smart phone or other mobile device. Details of such devices (e.g., processor, memory, data storage, display) may be omitted for the sake of clarity.

The data structures and code described in this detailed description are typically stored on a computer-readable storage medium, which may be any device or medium that can store code and/or data for use by a computer system. The computer-readable storage medium includes, but is not limited to, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules may include, but are not limited to, application-specific integrated circuit (ASIC) chips, field-programmable gate arrays (FPGAs) and other programmable-logic devices now known or later developed. When the hardware modules are activated, the hardware modules perform the methods and processes included within the hardware modules.

The foregoing descriptions of embodiments have been presented for purposes of illustration and description only. They are not intended to be exhaustive or to limit the disclosure to the forms disclosed. Accordingly, many modifications and variations will be apparent to practitioners skilled in the art.

What is claimed is:

1. A device comprising:
a processor;
a low-power network interface circuit; and
a high-power network interface circuit;
wherein the low-power network interface circuit is configured to:
receive, while the high-power network interface circuit is in a dormant state, a service advertisement from a remote device;
determine, based at least in part on the service advertisement, whether to establish a network connection with the remote device via the high-power network interface circuit; and
in response to a determination that a network connection is to be established with the remote device via the high-power network interface circuit, wake the high-power network interface circuit and connect to the remote device via the high-power network interface circuit;
wherein the service advertisement discloses one or more services provided by a high-power network interface circuit of the remote device.

2. The device of claim 1, wherein the low-power network interface circuit is further configured to transmit a request to the remote device regarding a service disclosed in the service advertisement.

3. The device of claim 2, wherein a subsequent service advertisement discloses one or more services provided by another high-power network interface circuit of the remote device.

4. The device of claim 3, wherein the low-power network interface circuit is further configured to:
receive a response from the remote device that specifies a broadcast time of a modified service advertisement;
receive the modified service advertisement from the remote device at the broadcast time, wherein the modified service advertisement discloses details of the service provided by the high-power network interface circuit of the remote device;
transmit another request to the remote device to connect to the remote device via the high-power network interface circuit of the device and the high-power network interface circuit of the remote device; and
receive another response from the remote device that confirms the requested connection.

5. The device of claim 4, wherein the low-power network interface circuit is further configured to:
broadcast an advertisement to the remote device, the advertisement disclosing information about the service;
receive a request associated with the broadcasted advertisement from the remote device; and
transmit a response to the remote device comprising information about the high power network interface circuit of the device.

6. The device of claim 2, wherein the request is extended to accommodate a disclosure of an interest of the device in the service, thereby causing the remote device to send a response to the device that further describes the service after receiving the extended request.

7. The device of claim 2, wherein:
the request comprises a connection request to establish a connection with the remote device via the low-power network interface circuit; and
subsequent communications over the connection comprise one or more data frames exchanged between the device and the remote device, wherein:
data frames transmitted from the device to the remote device comprise requests for information associated with services provided by the remote device; and
data frames transmitted from the remote device to the device comprise the requested information.

8. The device of claim 7, wherein the connection request and the one or more data frames are exchanged while the processor is in a dormant state.

9. The device of claim 1, wherein the service advertisement from the remote device discloses multiple services provided by multiple high-power network interface circuits of the remote device.

10. The device of claim 1, wherein prior to receiving the service advertisement from the remote device, the low-power network interface circuit is further configured to:
copy configuration information associated with the high-power network interface circuit into a component of the low-power network interface circuit; and
suspend the processor.

11. The device of claim 10, wherein prior to connecting to the remote device via the high-power network interface circuit, the low-power network interface circuit is further configured to send the configuration information to the remote device, thereby enabling the device and the remote device to connect via the high-power network interface circuit after the high-power network interface circuit and the processor are awakened, without sending the configuration information via the first high-power network interface circuit.

12. A computer-implemented method comprising:
receiving, via a low-power network interface of a device, while one or more high-power network interfaces of the device are in a dormant state, a service advertisement from a remote device;
determining, based at least in part on the service advertisement, whether to establish a network connection with the remote device via a high-power network interface of the device; and
in response to determining that a network connection is to be established with the remote device via the high-power network interface, waking a high-power network interface of the device and connecting to the remote device via the high-power network interface of the device;

wherein the service advertisement discloses one or more services provided by a high-power network interface of the remote device.

13. The computer-implemented method of claim 12, further comprising:

transmitting a request to the remote device regarding a service disclosed in the service advertisement.

14. The computer-implemented method of claim 13, wherein a subsequent service advertisement discloses one or more services provided by another high-power network interface of the remote device.

15. The computer-implemented method of claim 14, wherein the method further comprises:

receiving a response from the remote device that specifies a broadcast time of a modified service advertisement;

receiving the modified service advertisement from the remote device at the broadcast time, wherein the modified service advertisement discloses details of the service provided by the high-power network interface of the remote device;

transmitting another request to the remote device to connect to the remote device via the high-power network interfaces of the device and the remote device; and receiving another response from the device that confirms the requested connection.

16. The computer-implemented method of claim 13, wherein the service advertisement from the remote device discloses multiple services provided by multiple high-power network interfaces of the remote device, including the one or more services of the high-power network interface of the remote device.

17. The computer-implemented method of claim 13, wherein the request is extended to accommodate a disclosure of an interest of the device in the service, thereby causing the remote device to send a response to the device that further describes the service after receiving the extended request.

18. The computer-implemented method of claim 13, wherein:

the request comprises a connection request that establishes a connection with the remote device via the low-power network interface; and subsequent communications over the connection comprise one or more data frames exchanged between the device and the remote device, wherein:

data frames sent from the device to the remote device comprise requests for information associated with services provided by the remote device; and data frames transmitted from the remote device to the device comprise the requested information.

19. The computer-implemented method of claim 12, wherein prior to communicating with the remote device via the low-power network interface of the device, the method further comprises:

copying configuration information associated with the high-power network interface into a component of the low-power network interface; and suspending a processor of the device.

20. The computer-implemented method of claim 19, wherein prior to connecting to the remote device via the high-power network interface, the method further comprises:

transmitting the configuration information to the remote device, thereby enabling the device and the remote device to connect via the high-power network interface after the high-power network interface and the processor are awakened, without transmitting the configuration information via the high-power network interface.

21. The computer-implemented method of claim 12, wherein the high-power network interface of the device is one of the following:

a Neighbor Awareness Networking (NAN) interface;

a Wi-Fi Direct (WFD) interface; and an infrastructure-based wireless local area (WLAN) interface.

22. The computer-implemented method of claim 12, wherein the low-power network interface of the device is a Bluetooth low energy (BTLE) interface.

23. A non-transitory computer-readable medium storing instructions that, when executed by a computer, cause the computer to perform a method, the method comprising:

receiving, via a low-power network interface of a device, while one or more high-power network interfaces of the device are in a dormant state, a service advertisement from a remote device;

determining, based at least in part on the service advertisement, whether to establish a network connection with the remote device via a high-power network interface of the device; and in response to determining that a network connection is to be established with the remote device via the high-power network interface, waking a high-power network interface of the device and connecting to the remote device via the high-power network interface of the device;

wherein the service advertisement discloses one or more services provided by a high-power network interface of the remote device.

* * * * *